United States Patent
Hendrichs et al.

(10) Patent No.: US 7,133,419 B1
(45) Date of Patent: Nov. 7, 2006

(54) SYSTEM AND METHOD FOR REDUCING POWER CONSUMPTION BY SPECTRAL SHAPING OF SIGNALS

(75) Inventors: Laurent Hendrichs, Seabright, NJ (US); William Scholtz, Red Bank, NJ (US)

(73) Assignee: Conexant, INc., Red Bank, NJ (US)

( * ) Notice: Subject to any disclaimer, the term of this patent is extended or adjusted under 35 U.S.C. 154(b) by 1120 days.

(21) Appl. No.: 10/138,365

(22) Filed: May 3, 2002

Related U.S. Application Data

(60) Provisional application No. 60/288,916, filed on May 4, 2001.

(51) Int. Cl.
*H04J 3/16* (2006.01)
*H04J 3/22* (2006.01)

(52) U.S. Cl. .................. 370/468; 370/252; 370/208; 375/222; 375/220

(58) Field of Classification Search .................. None
See application file for complete search history.

(56) References Cited

U.S. PATENT DOCUMENTS

| | | | | |
|---|---|---|---|---|
| 5,528,593 A | * | 6/1996 | English et al. | 370/391 |
| 5,832,387 A | * | 11/1998 | Bae et al. | 455/522 |
| 5,852,633 A | * | 12/1998 | Levin et al. | 375/130 |
| 5,878,329 A | * | 3/1999 | Mallinckrodt | 455/69 |
| 6,144,696 A | * | 11/2000 | Shively et al. | 375/222 |
| 6,512,788 B1 | * | 1/2003 | Kuhn et al. | 375/224 |
| 7,020,070 B1 | * | 3/2006 | Lindoff | 370/206 |

* cited by examiner

*Primary Examiner*—Doris H. To
*Assistant Examiner*—Chirag Shah
(74) *Attorney, Agent, or Firm*—Thomas, Kayden, Horstemeyer & Risley

(57) ABSTRACT

The present invention provides a system and method for reducing power consumption by shaping the spectrum of a downstream signal. Incremental improvements in power consumption due to spectral shaping produces a noticeable reduction in the aggregate power consumed at a central office in asymmetric digital subscriber line (ADSL) systems.

17 Claims, 17 Drawing Sheets

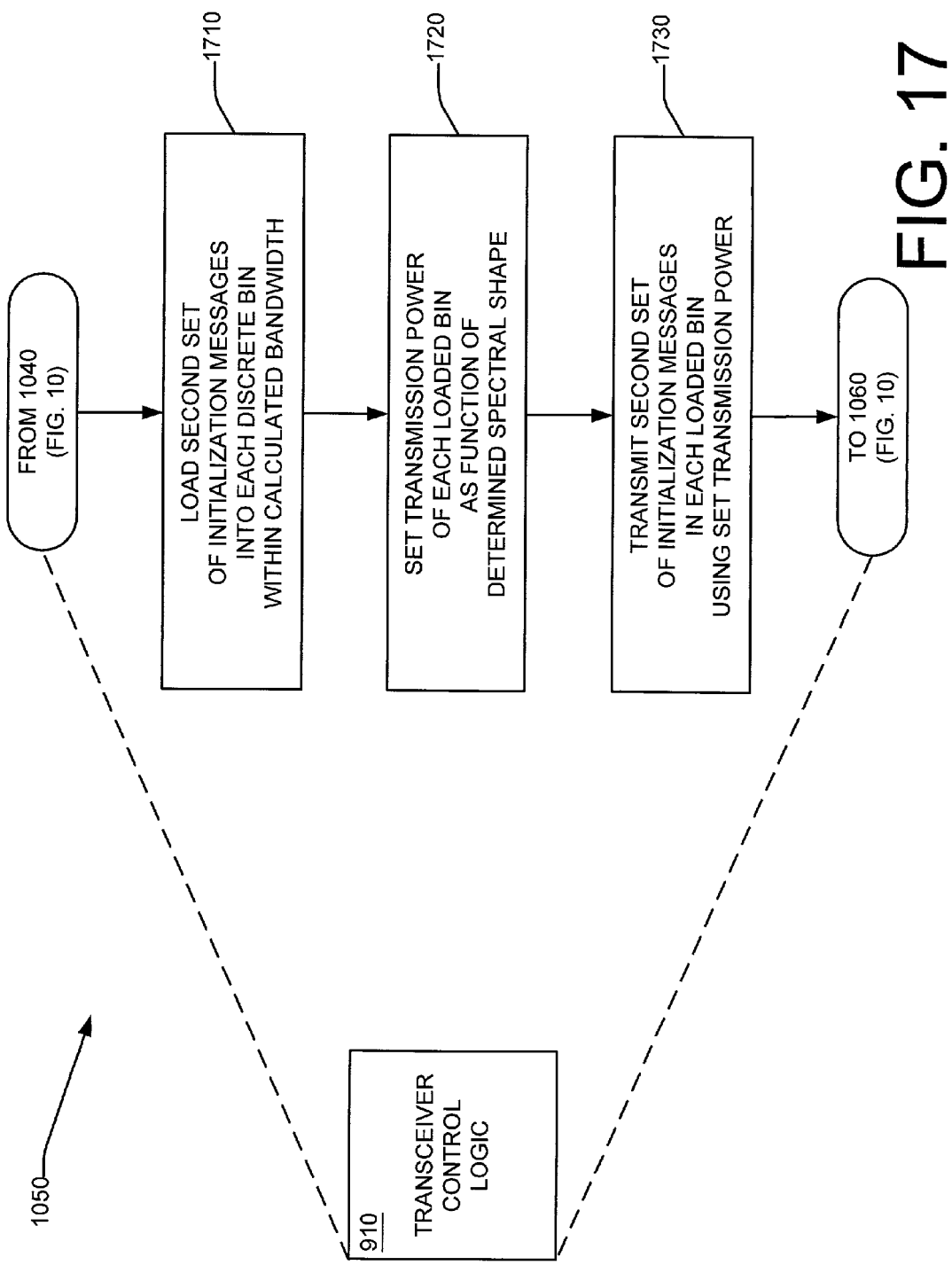

SYSTEM AND METHOD FOR REDUCING POWER CONSUMPTION BY SPECTRAL SHAPING OF SIGNALS

CROSS REFERENCE TO RELATED APPLICATIONS

This application claims the benefit of U.S. Provisional Patent No. 60/288,916, dated May 4, 2001, which is incorporated herein by reference in its entirety.

FIELD OF INVENTION

This invention relates generally to communications systems, and more particularly to a system and method for reducing power consumption by shaping the spectrum of a signal.

BACKGROUND

Signal integrity and system performance in digital subscriber line (DSL) systems is a function of transmission power. In other words, the signal-to-noise ratio (SNR) of a signal generally increases as the transmission power increases, and, conversely, the SNR of the signal decreases as transmission power decreases. While the power consumption at individual customer premises (i.e., upstream power consumption) is relatively small, the aggregate effect of hundreds of DSL ports in a DSL access multiplexer (DSLAM) at a central office (CO) becomes significant (i.e., the downstream power consumption becomes significant).

In the specific context of asymmetric digital subscriber line (ADSL) systems, the power level of a downstream signal to a given receiver location is determined by the ADSL transceiver unit (ATU) of the receiver (i.e., the ATU-R), and not the ATU at the CO (i.e., the ATU-C). Thus, in a conventional bit-loading approach within traditional ADSL systems, the ATU-R controls the transmission power, and the role of the CO is merely to comply with the request of the ATU-R. Since a cutback in power results in a loss of performance, the conventional bit-loading approach results in a sub-optimal use of power because the ATU-R invariably requests more power than needed for signal transmission. In other words, there is little incentive for the ATU-R to request a power cutback since a power cutback would almost always result in a loss of performance. Consequently, the CO consumes more power than necessary because the downstream signal power remains unknown until both the ATU-R and ATU-C enter data mode.

Additionally, during initialization, the entire downstream band is transmitted with a flat power spectrum (i.e., the same energy across the entire power spectrum). Since a flat power spectrum is rarely the optimum power spectrum, the initialization procedure is executed with a sub-optimal use of power. Furthermore, as loop length (i.e., reach between the CO and the customer premises) exceeds a given distance, the SNR decreases to the point where not all bins are used for data transmission. In other words, for long loops, only a portion of the bandwidth is used for data transmission. Thus, a full-bandwidth initialization of signals consumes more power than necessary for those loops that utilize only a portion of the bandwidth.

Due to the sub-optimal power consumption, which exists in ADSL systems as well as other types of signal transmission systems, there is a need in the art for reducing power consumption during signal transmission.

SUMMARY

The present invention provides a system and method for reducing power consumption by shaping the spectrum of a downstream signal.

Briefly described, in architecture, one embodiment of the system includes spectral shaping logic, which determines a spectral shape that allows for reduced power consumption during signal transmission. In addition to the spectral shaping logic, the system comprises a transceiver control logic, which transmits the signal using the spectral shape that was determined by the spectral shaping logic.

The present invention can also be viewed as providing a method for reducing power consumption by shaping the spectrum of a downstream signal. In this regard, one embodiment of the method may be seen as comprising the steps of calculating a bandwidth for signal transmission, determining a spectral shape that allows transmission of the signal with minimal power consumption, and initializing a signal communication system using spectral shape and the calculated bandwidth. Once the system has been initialized, data may be transmitted within the signal communication system with a reduced power consumption.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The above and further features, advantages, and benefits of the present invention will be apparent upon consideration of the following detailed description, taken in conjunction with the accompanying drawings, in which like reference characters refer to like parts throughout.

FIG. 17 is a flowchart showing steps associated with initializing the system of FIG. 2.

DETAILED DESCRIPTION OF DRAWINGS

Figure 1:
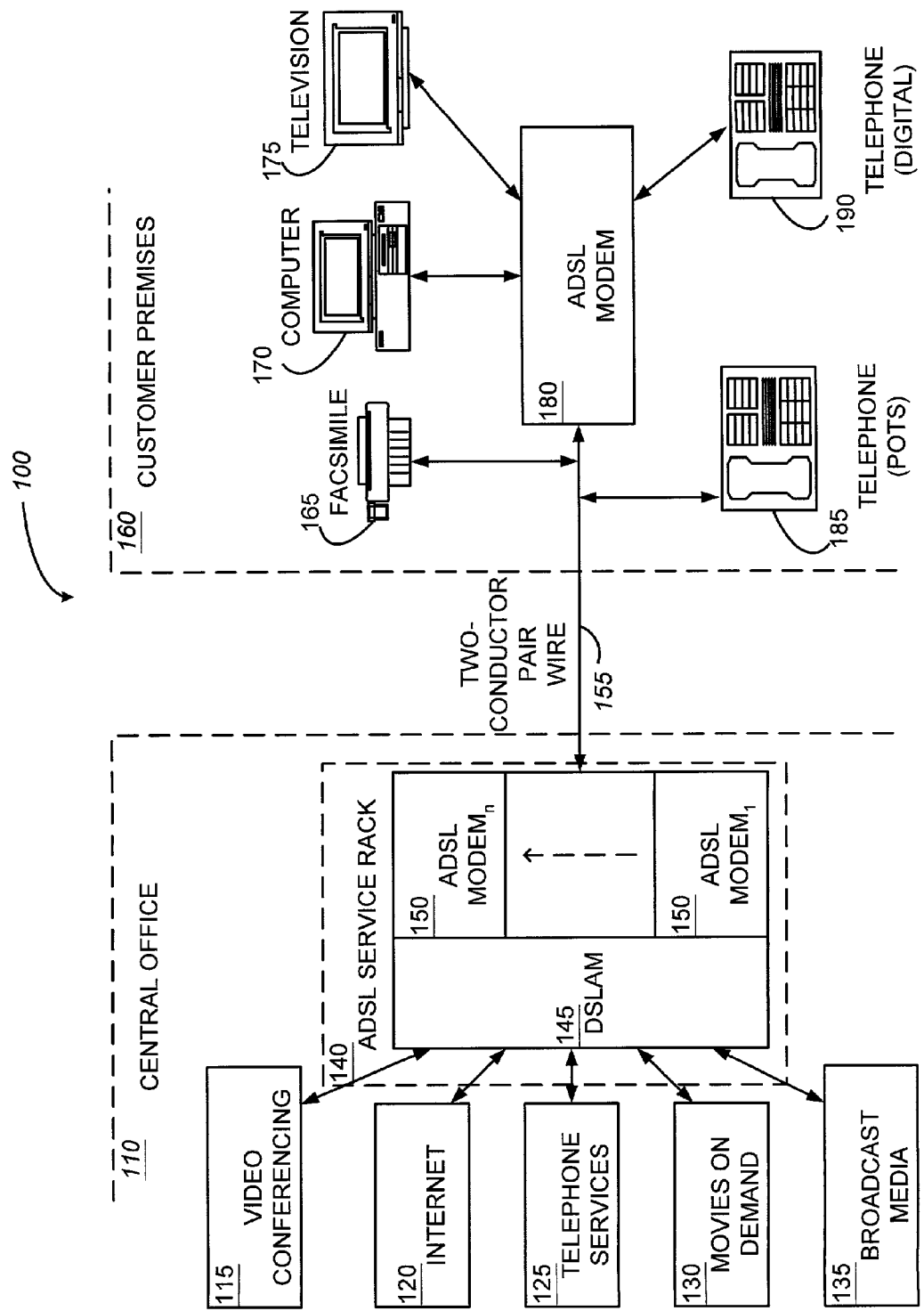
FIG. 1 is a block diagram showing a signal communication system.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

FIG. 1 is a block diagram showing a signal communication system 100. In this non-limiting example environment, a central office 110 is connected to a customer premises 160 via a two-conductor pair wire 155. On the side of the central office 110 an ADSL service rack 140 gathers information for transmission. This information may be in the form of video conferencing 115, Internet 120, telephone services 125, movies on demand 130, or broadcast media 135. All of this information is gathered at a digital subscriber line access multiplexer (DSLAM) 145, which assembles the data for transmission by ADSL modems 150. Once this information has been coded and framed, it is sent to the customer premises 160 via a local loop, generally a two-conductor pair 155. The data is received at the customer premises 160 by an ADSL modem 180. This information is then decoded and provided to the user. Several non-limiting examples of this include a fax 165, a user's computer 170, a television set 175, an analog telephone 185, or, in the alternative, a digital telephone 195.

Figure 2:
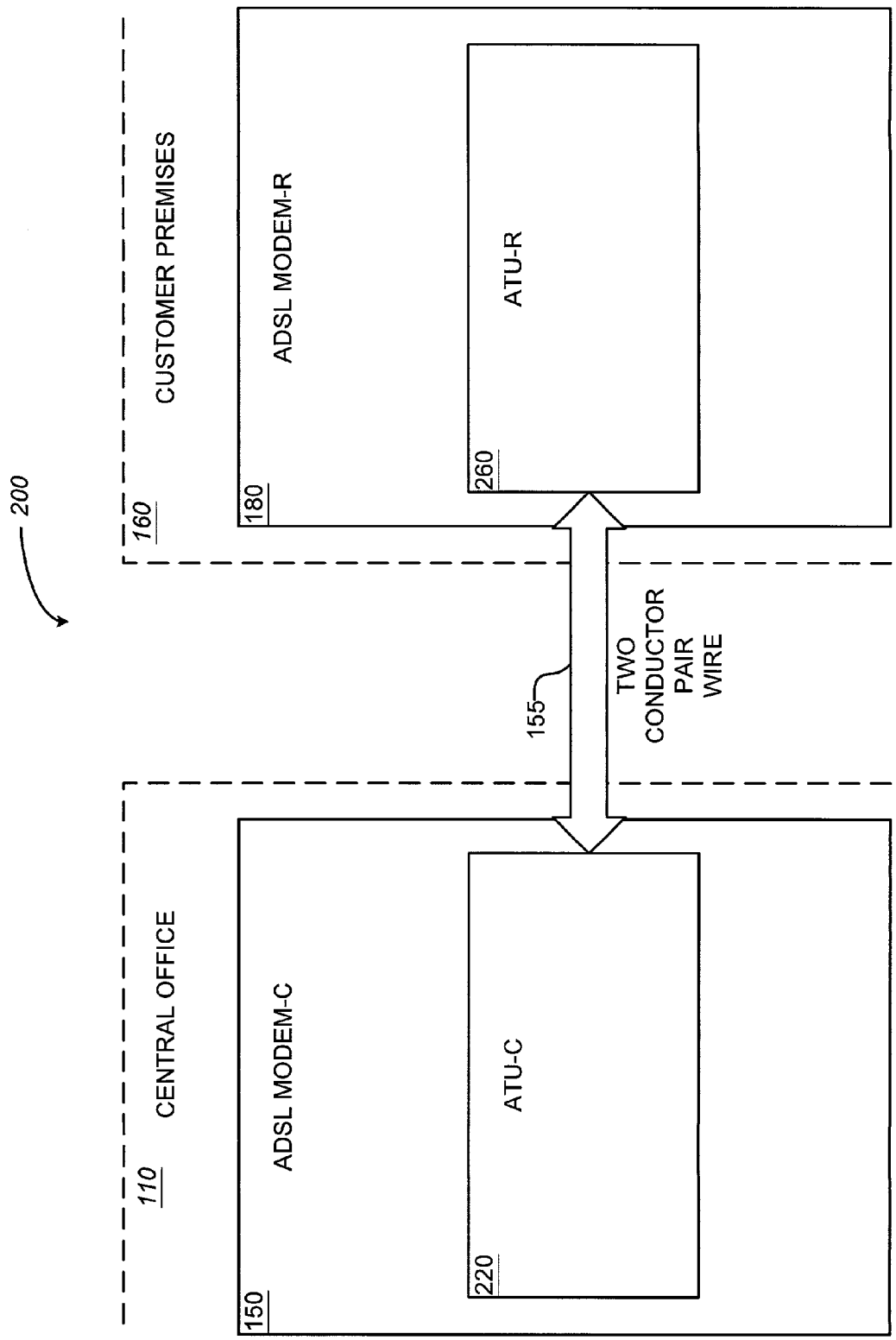
FIG. 2 is a block diagram showing an exploded view of the ADSL modems at the central office and the customer premises of FIG. 1.

FIG. 2 is a block diagram showing an exploded view of the ADSL modems 120, 180 at the central office 110 and the customer premises 160 of FIG. 1. As shown in FIG. 2, the ADSL modem 150 at the central office 110 includes an ADSL transceiver unit (ATU-C) 220 that is configured to transmit downstream data and receive upstream data through the two-conductor pair wire 155. On the other end of the local loop 155, at the ADSL modem 180 of the customer premises 160, a remote ADSL transceiver unit (ATU-R) 260 is configured to receive the downstream data from the ATU-C 220 and transmit the upstream data from the ATU-R 260 to the ATU-C 220. If there is only one ATU-C 220 located at the central office 110, then power consumption by the single ATU-C 220 is of little concern. However, since the ATU-C 220 operates within the ADSL modem 150, and the ADSL modem 150 operates within the ADSL service rack 140 (FIG. 1), if the ADSL service rack 140 (FIG. 1) has multiple ADSL modems 150 (FIG. 1), then the aggregate of all of the ATU-C 220 within the multiple ADSL modems 150 (FIG. 1) provides for significant power consumption. By reducing the power consumption of each of the ATU-C 220 in the ADSL service rack 140 (FIG. 1), a significant amount of aggregate power may be conserved. This is illustrated in FIGS. 3 through 8, which show the effect of spectral shaping on the discrete bins used in transmission of data within an ADSL system.

Figure 3:
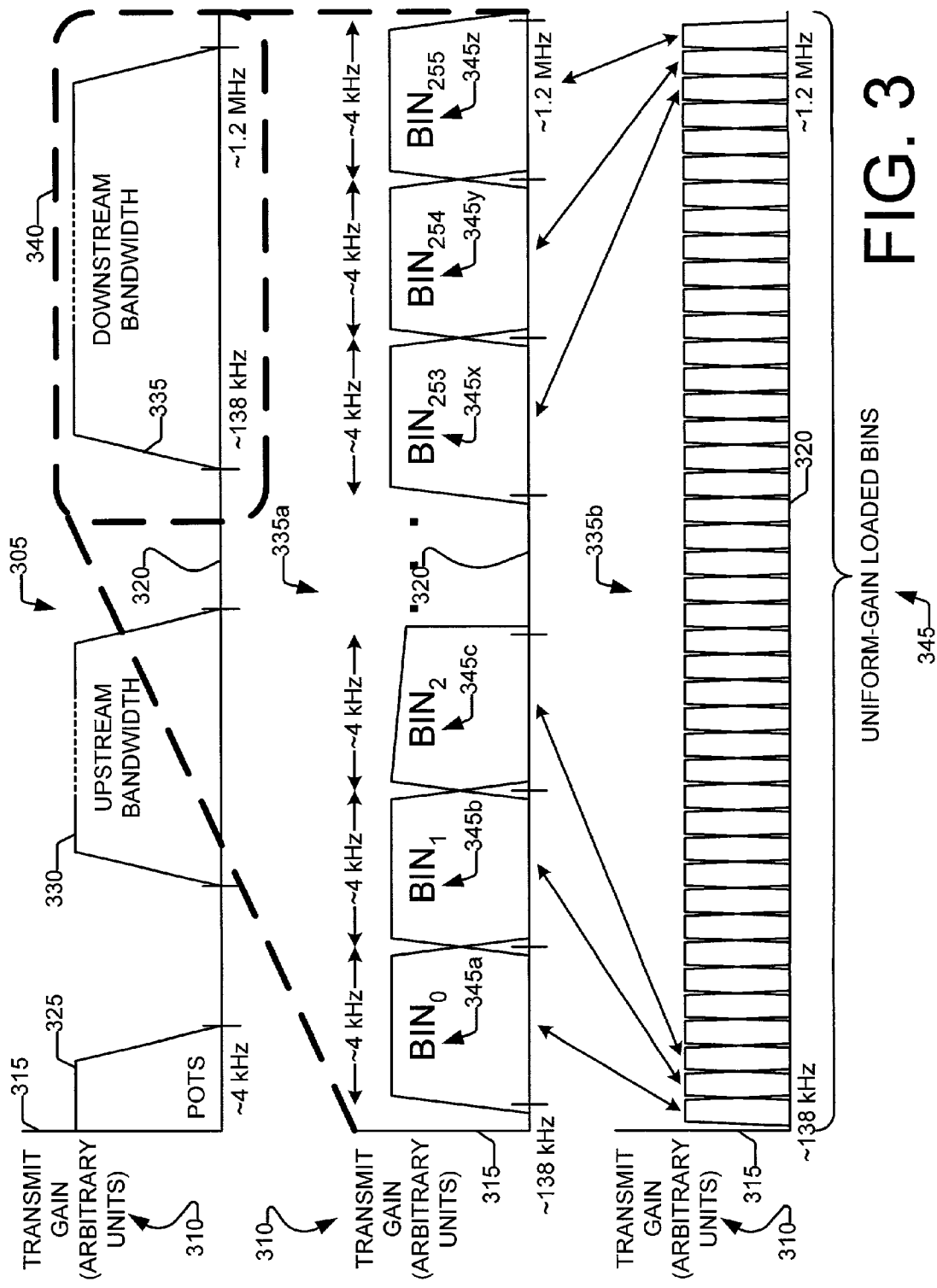
FIG. 3 is a diagram showing the division of bandwidth in the ADSL system of FIG. 2, and, specifically, showing a flat-gain (or uniform) downstream signal having multiple bins.

FIG. 3 is a diagram showing the division of bandwidth in the ADSL system of FIG. 2, and, specifically, showing a flat-gain (or uniform gain) downstream signal having multiple bins. The top graph of FIG. 3 shows the division of bandwidth in an ADSL system. In the top graph, frequency 320 is plotted on the x-axis while gain 315 is plotted on the y-axis. For purposes of illustration, the gain is plotted using arbitrary units 310. As shown in the top graph, bandwidth below approximately 4 kHz in an ADSL system is reserved for communications using plain old telephone systems (POTS). This bandwidth may be referred to as the POTS bandwidth 325. The bandwidth above approximately 4 kHz and below approximately 138 kHz is usually reserved for transmission of upstream signals, and, hence, may be referred to as the upstream bandwidth 330. The greater portion of bandwidth in an ADSL system is typically reserved for downstream transmission of signals. This bandwidth, referred to as the downstream bandwidth 335, ranges from approximately 138 kHz to approximately 1.2 MHz. In ADSL discrete multi-tone (DMT) systems, the downstream bandwidth 335 is further divided into a finite number of discrete bins 345 that may be used to carry data. This is shown in greater detail in the middle graph of FIG. 3. The middle graph shows an exploded view of the downstream bandwidth 335. Again, the gain 315 is plotted on the y-axis in arbitrary units, while the frequency 320 is plotted on the x-axis. As shown in the middle graph, the downstream bandwidth 335a is divided into multiple discrete bins 345a . . . 345z (hereinafter referred to simply as 345). In a typical ADSL DMT system, these discrete bins 345 each have a bandwidth of approximately 4 kHz. Also, during conventional initialization procedures, the bins 345 each have a uniform gain. This is more clearly illustrated in the bottom graph of FIG. 3. The bottom graph shows the gain 315 plotted on the y-axis in arbitrary units, and the frequency 320 plotted on the x-axis. As shown in the bottom graph of FIG. 3, each of the bins 345 used for data transmission during initialization has the same gain. Hence, when the bins 345 are loaded for data transmission during initialization, they have a uniform gain across the entire downstream bandwidth 335b. Each bin of the uniform-gain loaded bins 345 consumes approximately the same amount of power. Thus, use of all the bins 345 across the entire downstream bandwidth 335b may result in wasted power if part of the downstream bandwidth 335b is unusable. Additionally, supplying uniform power to each bin (i.e., a uniform gain to each bin) in the downstream bandwidth 335b may result in wasted power if less power may be sufficient for data transmission. These deficiencies are shown in greater detail in FIGS. 4 through 8.

Figure 4:
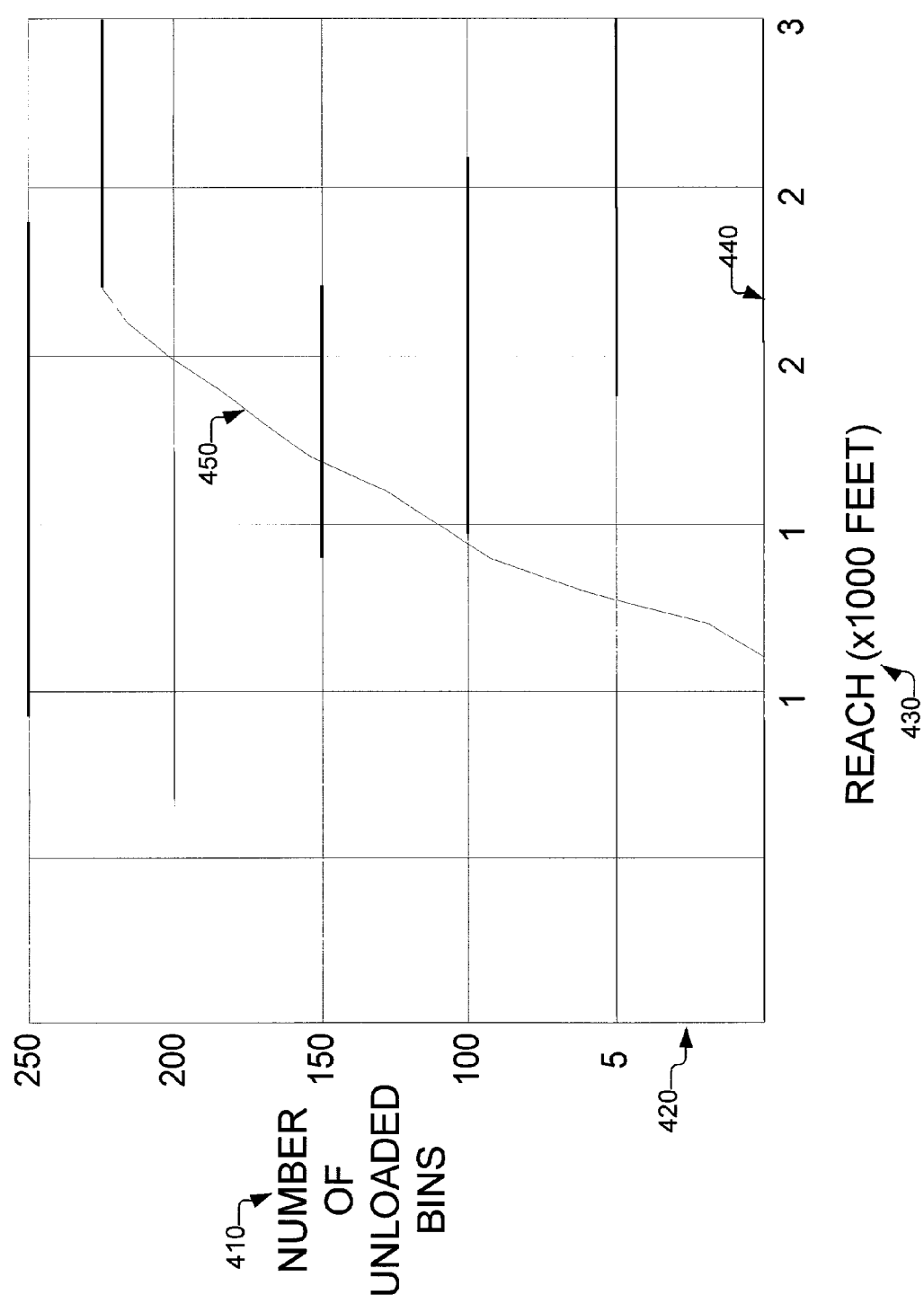
FIG. 4 is a graph showing bin loading as a function of reach in an example ADSL DMT system.

FIG. 4 is a graph showing bin-loading as a function of reach 430 in an example ADSL DMT system. In the graph of FIG. 4, the reach 430 (i.e., loop length) is plotted on the x-axis 440 while number of unloaded bins 410 is plotted on the y-axis 420. As shown here, when the reach 430 is less than approximately 12 kft, all of the bins 345 (FIG. 3) are loaded because all of the bins 345 (FIG. 3) have a sufficient signal-to-noise ratio (SNR) to satisfy system requirements (i.e., the SNR is sufficient to satisfy minimum bit-error rate (BER) requirements of the ADSL DMT system). However, as the reach 430 increases beyond 12 kft, the number of loaded 410 bins decreases because the SNR of several bins 345 (FIG. 3) become insufficient to satisfy minimum BER requirements of the ADSL DMT system. The number of unloaded bins 410 increases with reach 430 until the reach 430 exceeds approximately 22 kft, at which time the SNR of every bin has degraded to such a level that virtually none of the bins 345 (FIG. 3) have sufficient SNR to satisfy the minimum BER requirements of the ADSL DMT system. One example of a downstream bandwidth having unloaded bins is shown in FIG. 5.

Figure 5:
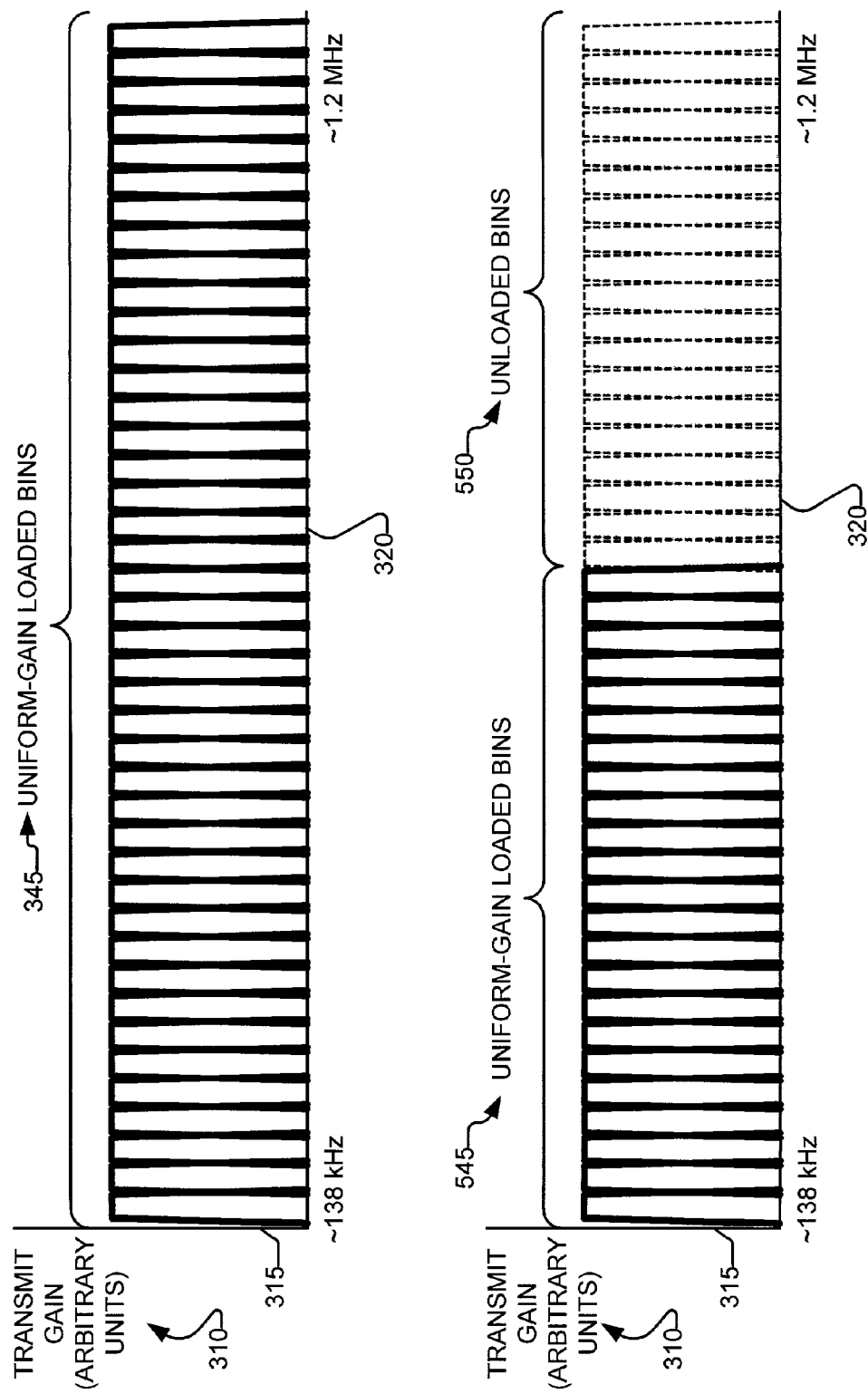
FIG. 5 is a diagram comparing the unloaded bins of FIG. 4 in the downstream bandwidth with the uniform-gain loaded bins of FIG. 3.

FIG. 5 is a diagram comparing the downstream bandwidth 335 (FIG. 3) having uniform-gain loaded bins 345 (i.e., the bottom graph of FIG. 3) with a downstream bandwidth having unloaded bins 550. As explained with reference to FIG. 4, since a number of bins are unloaded between approximately 12 kft and approximately 22 kft, supplying power to those unloaded bins 550 during initialization or data transmission would result in wasted power. In the non-limiting example of FIG. 5, the bottom graph shows the unloaded bins 550 that result from an increase in reach 430 (FIG. 4). These unloaded bins 550 are shown in broken lines. If the downstream bandwidth is divided into uniform-gain loaded bins 545 that carry data and unloaded bins 550, then supplying power to the entire downstream bandwidth results in wasted power due to the supplying of power to unloaded bins 550, which are not used in data transmission. This wasted power is shown as a shaded region in the bottom graph of FIG. 5. One embodiment of the system, as explained below, allows spectral shaping of the downstream signal so that power is not supplied to the unloaded bins 550, thereby conserving power. Thus, by using spectral shaping, no power is supplied to the shaded portion of the bottom graph in FIG. 5.

Figure 6:
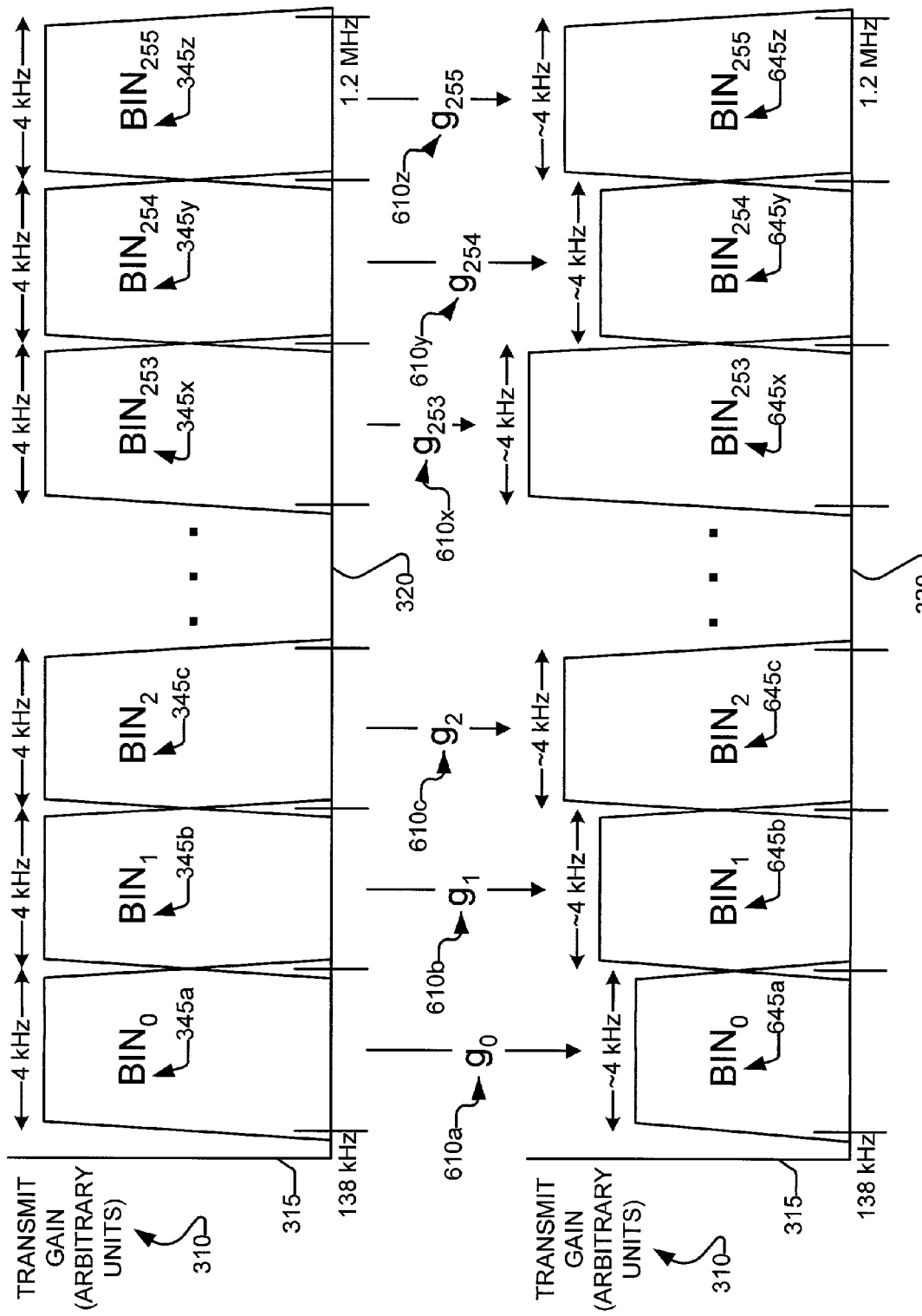
FIG. 6 is a diagram showing a conversion of bins from uniform-gain bins to gain-scaled bins.

FIG. 6 is a diagram showing a conversion of the bins from uniform-gain bins to gain-scaled bins. As explained with reference to FIG. 3, uniform-gain loaded bins 345 may be inefficient because a sufficient SNR may be achieved for certain bins using less power than for other bins. Thus, as shown in FIG. 6, each bin 345 may have a gain 610 associated with the bin 345 such that the gain reflects a minimum power requirement to achieve a sufficient bin SNR. Hence, by multiplying each uniform-gain loaded bin 345 with a corresponding gain 610, a gain-scaled loaded bin 645 may be generated such that the gain-scaled loaded bin 645 has sufficient power to satisfy the minimum BER requirement of an ADSL DMT system without having substantial excess power.

Figure 7:
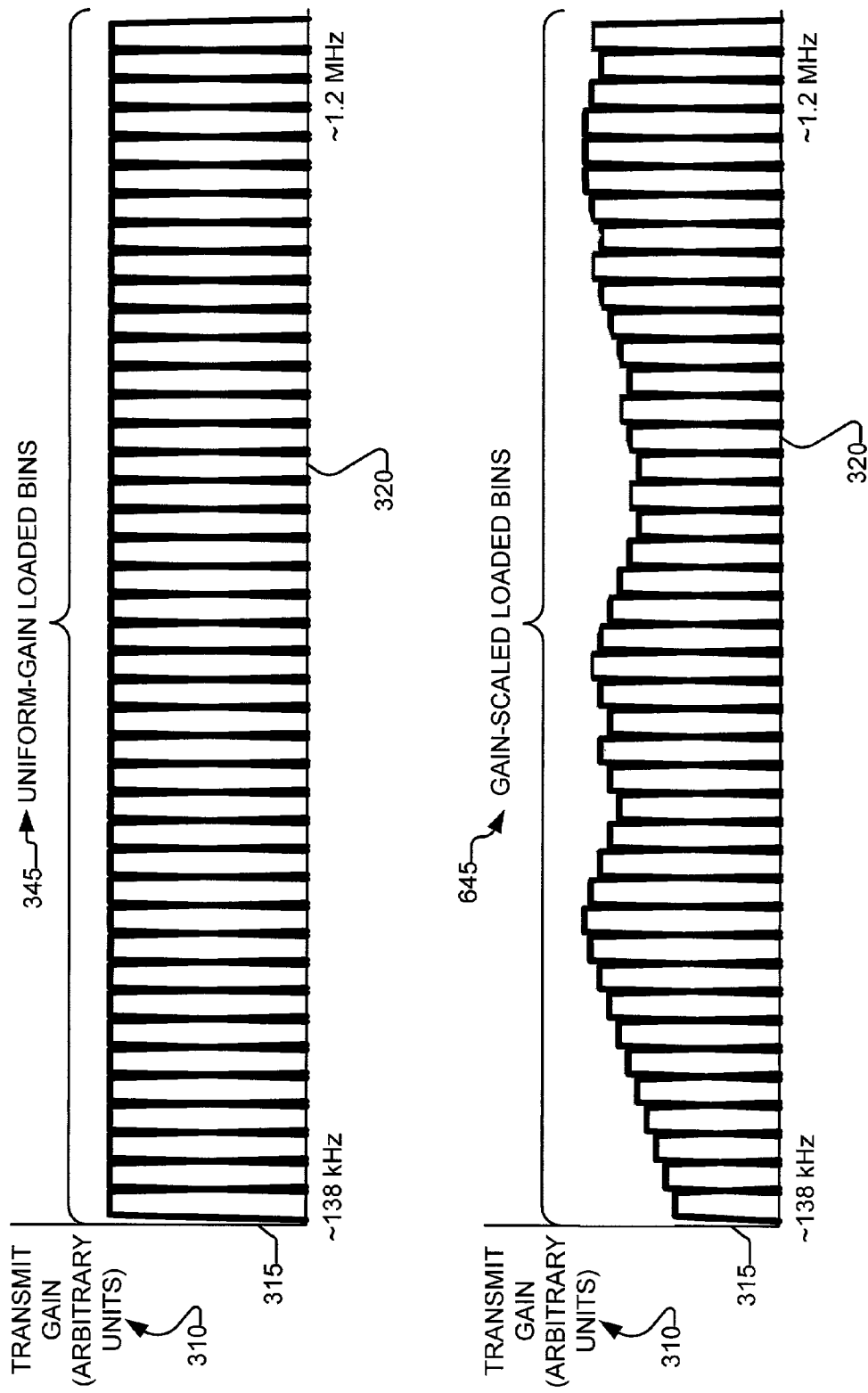
FIG. 7 is a diagram comparing uniform-gain loaded bins with gain-scaled loaded bins.

FIG. 7 is a diagram comparing uniform-gain loaded bins 345 with gain-scaled loaded bins 645 for the entire downstream bandwidth. In this non-limiting example, all of the bins in the entire downstream bandwidth are shown as being loaded. If a gain is applied to each of the uniform-gain loaded bins 345 as explained with reference to FIG. 6, then the resulting downstream signal takes on a specific spectral shape due to the different gains 610 (FIG. 6) of each of the gain-scaled loaded bins 645. Since certain bins may be transmitted with less power, a significant amount of power may be conserved due to spectral shaping. The shaded region in the bottom graph of FIG. 7 represents the power saved by spectral shaping.

Figure 8:
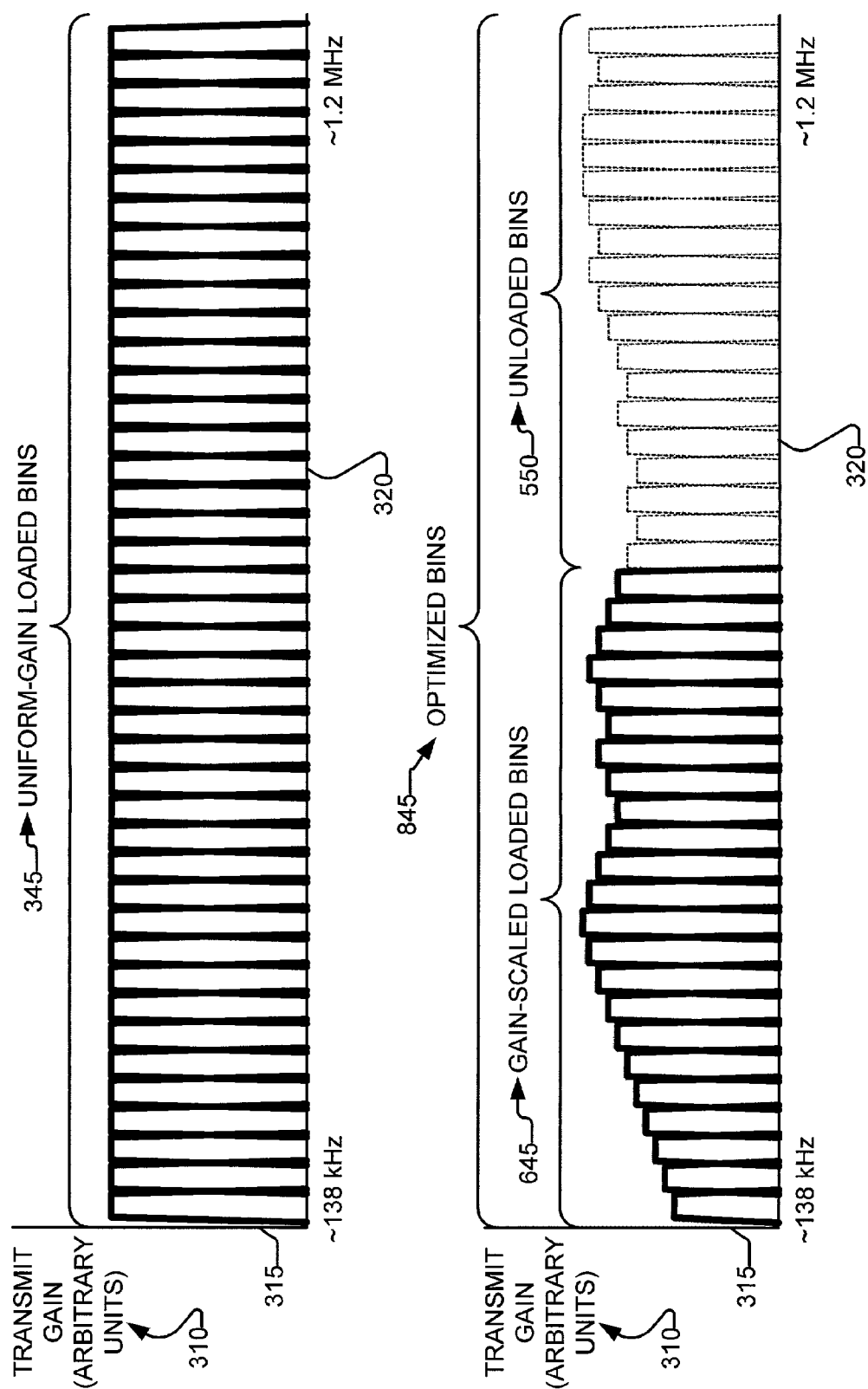
FIG. 8 is a diagram comparing uniform-gain loaded bins with optimized bins after the application of spectral shaping.

FIG. 8 is a diagram comparing uniform-gain loaded bins 345 with optimized bins 845 after the application of spectral shaping. In the non-limiting example of FIG. 8, a combined situation from both FIG. 5 and FIG. 7 are shown. Thus, in this non-limiting example, the downstream bandwidth comprises both a segment of unloaded bins 550 and a segment of gain-scaled loaded bins 645. This shaped spectrum is referred to as having optimized bins 845 since power is conserved by optimizing the usable bandwidth as well as by optimizing the gain associated with each usable bin. As compared to the uniform-gain loaded bins 345 in the top graph of FIG. 8, the optimized bins 845 in the bottom graph of FIG. 8 provide a greater power saving. The shaded region in the bottom graph of FIG. 8 represents the conserved power. As the usable bandwidth decreases, more power is conserved due to spectral shaping since power is not used by the unusable bandwidth. Additionally, as the SNR of the system improves for any reason (e.g., shorter loop length, etc.), more power is conserved with spectral shaping because the gain for each bin will be optimized to minimize wasted power.

Figure 9:
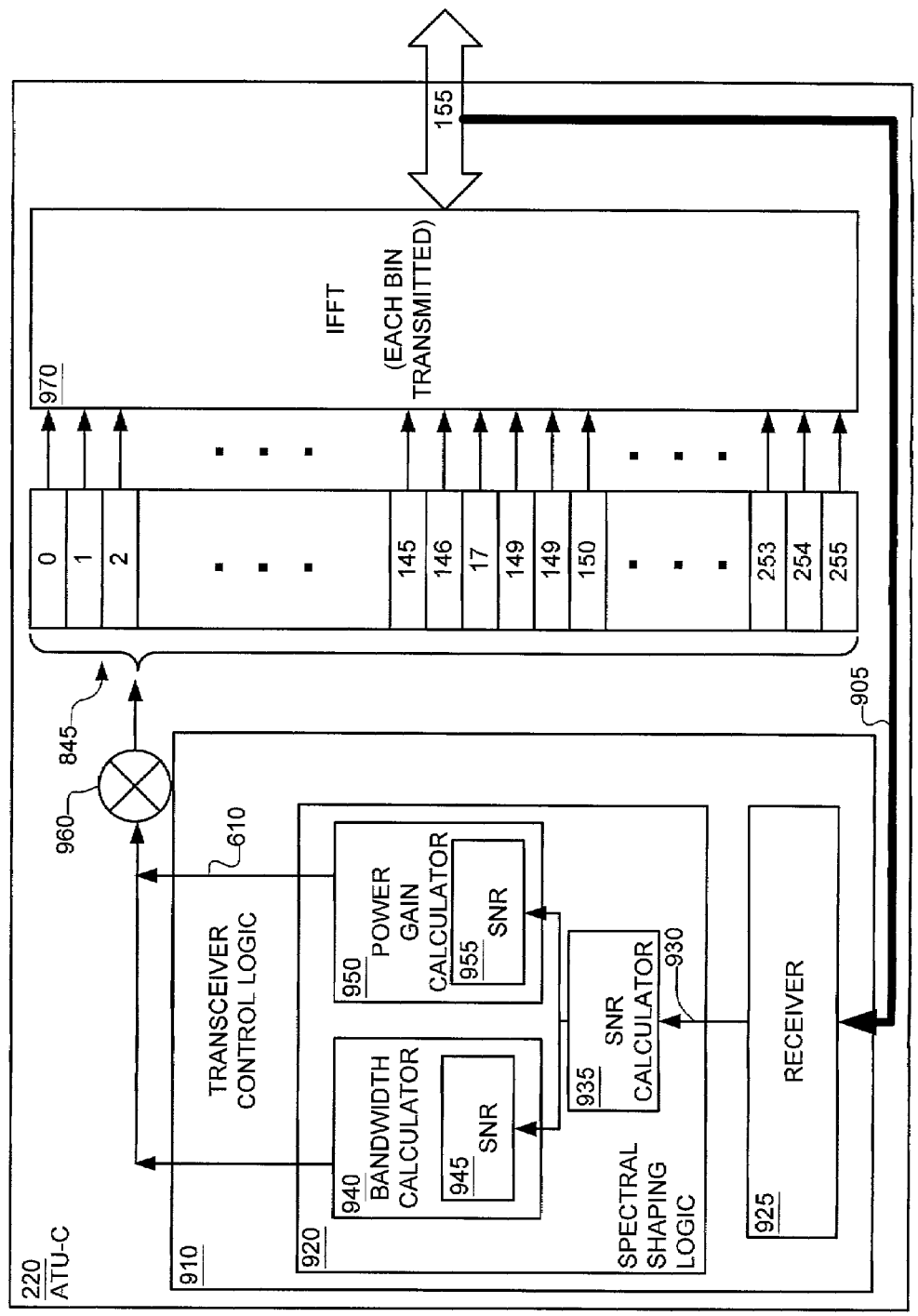
FIG. 9 is a block diagram showing an exploded view of the ATU-C of FIG. 2, configured to perform the spectral shaping as shown in FIGS. 5 through 8.

Having described the principles associated with spectral shaping, attention is turned to FIG. 9, which illustrates certain features of one embodiment of a system that is configured to shape the spectrum of a downstream signal.

FIG. 9 is a block diagram showing an exploded view of the ATU-C 220 of FIG. 2, configured to perform spectral shaping as shown in FIGS. 5 through 8. The ATU-C 220 comprises spectral shaping logic 920 configured to determine a spectral shape of a downstream signal in order to optimize power consumption by the ATU-C 220. One such example of an optimized spectrum is the spectrum having optimized bins 845 as shown in FIG. 8. The ATU-C 220 further comprises transceiver control logic 910, which is configured to transmit the downstream signal using the spectral shape that was determined by the spectral shaping logic 920. In one embodiment of the invention, the spectral shaping logic 920 is configured as part of the transceiver control logic 910. However, it will be clear to one of ordinary skill in the art that the two logic components may be located adjacent to each other, or even detached from each other, so long as the functionality of the logic components are not destroyed.

In one embodiment, the transceiver control logic 910 comprises a receiver 925 that is configured to receive information from the ATU-R 260 (FIG. 2). Part of the function of the transceiver logic control 910 is to exchange information with the ATU-R 260 (FIG. 2) during a pre-initialization stage such that information is exchanged between the ATU-C 220 and the ATU-R 260 (FIG. 2). During the pre-initialization stage, the ATU-C 220 receives messages from the ATU-R 260 (FIG. 2) including an R-B&G message as well as an R-MSG2 message. Since these messages are described in detail in standards such as T1.413 (ANSI T1.413-1998) and G.DMT (ITU G992.1), only a cursory discussion of the R-B&G and R-MSG2 messages is included herein, as reference may be made to the ANSI and ITU standards publications for further details relating to these messages. The T1.413 (ANSI T1.413-1998) and G.DMT (ITU G992.1) standards describing these messages are, thus, incorporated herein by reference in their entireties. The R-B&G message that is transmitted by the ATU-R 260 (FIG. 2) to the ATU-C 220 includes information on the number of bits, $b_i$, allocated to each discrete bin as well as information on scaling factors, $g_i$, associated with each bin. Thus, when the receiver 925 at the ATU-C 220 receives the R-B&G message from the ATU-R 260 (FIG. 2), the ATU-C 220 has some information related to system characteristics. Additionally, the R-MSG2 message carries information that is related to performance margin, M, for a given system configuration. All of this information that is received by the ATU-C 220 is used in determining the spectral shape.

The system further comprises a signal-to-noise ratio (SNR) calculator 930 that is configured to calculate a bin-SNR for each of the discrete bins. In a preferred embodiment, the SNR calculator 930 is located within the spectral shaping logic 920. The SNR calculator 930 receives the $b_i$, $g_i$, and M information from the receiver 925, and calculates the SNR for each bin, i, as:

$$SNR_i = \frac{(2^{b_i} - 1)\Gamma}{g_i^2} \times 10^{\frac{M}{10}}, \quad [\text{Eq. 1}]$$

wherein $\Gamma$ is a SNR gap, which is defined as:

$$10\log_{10}(\Gamma) = 9.8 - (\gamma_{coding\_gain} - \gamma_{noise\_margin}) \quad [\text{Eq. 2}].$$

Thus, assuming a noise margin of zero, and a desired bit-error rate (BER) of $10^{-7}$, $\gamma$ would be approximately 9.55.

In addition to the SNR calculator 935, the spectral shaping logic 920 further comprises a bandwidth calculator 940 and a power gain calculator 950. The bandwidth calculator 940 is configured to receive the calculated bin-SNR from the SNR calculator 935 and store the calculated bin-SNR in a portion of memory 945 allocated for the bin-SNR. Given the calculated bin-SNR for each of the bins, the bandwidth calculator 940 is configured to segregate each of the bins in the downstream bandwidth into either bins that have sufficient bin-SNR to carry data or unloaded bins. This is done by comparing the calculated bin-SNR to a threshold SNR that is indicative of the minimum BER requirement of a particular system. If the bin-SNR for a particular bin is not less than the threshold SNR, then the bin is designated as a bin configured to carry data. Otherwise, the bin is designated as an unloaded bin. Stated differently, if it is determined that a given bin has insufficient capacity, then that bin will not be used for data transmission. Thus, the bandwidth calculator 940 determines, to some extent, the spectral shape as described with reference to FIGS. 5 and 8. A specific example of this is provided with reference to spectral shaping in general. This specific example is provided following the description of the power gain calculator 950.

The power gain calculator 950 is configured to receive the calculated bin-SNR from the SNR calculator 935 and determine a gain for each of the discrete bins. Thus, the power gain calculator 950 determines, to some extent, the spectral shape as described with reference to FIGS. 6 through 8. The power gain calculator 950 is further configured to determine a bin bit allocation and a bin power level so that power consumption by each bin is reduced.

Many factors affect the determination of both the downstream bandwidth and the bin power level. Because of Reed-Solomon (RS) and trellis coding in ADSL DMT systems, the number of bits allocated per DMT symbol is typically higher than the number of payload bits per DMT symbol. The total number of bits per symbol is, therefore, a function of the payload, the number of redundancy bits (i.e., for RS coding), and the number of bins such that $b_i$ is greater than zero (hereinafter referred to as ncloaded). In other words, the total number of bits per symbol is represented as:

$$\sum_{i=0}^{255} b_{i,1} = \frac{(K_1 + R_1)}{R_1} + roundup\left(\frac{ncloaded_1}{2}\right), \quad [\text{Eq. 3}]$$

wherein $K_1$ is the selected payload rate, and $R_1$ is the pre-initialization rate, and the "roundup" function accounts for the presence of trellis-coding. Given an R-RATES2 message received from the ATU-R 260 (FIG. 2), which indicates the selected rate option, the value of $K_1$ may be deduced. Thus, where the bit rate is fixed, and the central office (CO) seeks to optimize power for the fixed bit rate, the CO pre-computes a total number of bits per DMT symbol including coding gain overhead. However, because the rate varies, the coding gain and the overhead will change at initialization. In order to accurately predict the coding parameters for initialization, certain assumptions are made. First, it is assumed that the coding gain is constant. Secondly, it is assumed that the percentage of RS overhead is constant so that:

$$\frac{R}{K_1 + R_1} = \text{constant.} \quad [\text{Eq. 4}]$$

Thirdly, it is assumed that the trellis coding overhead is also constant. Thus, during initialization, the target bit allocation, $B_{target}$, is given as:

$$B_{target} = \sum_{i=0}^{255} b_{i,1} = \left\lceil \frac{\left(\frac{R_{desired}}{32}\right) + FOH}{\left(1 - \frac{R_1}{K_1 + R_1}\right)} \right\rceil + roundup\left(\frac{ncloaded_1}{2}\right), \quad [\text{Eq. 5}]$$

wherein $R_{desired}$ is the desired payload rate for initialization expressed in kbps, and FOH is the framing overhead per DMT symbol.

Having determined $B_{target}$ and the SNR, an optimal spectral shape may be determined for a given transmission power, $P_{av}$, and a desired payload rate, $R_{desired}$. The desired spectral density of bin i, $\gamma_i$, may be represented as:

$$\gamma_i = \lambda - N_i \quad [\text{Eq. 6}],$$

for $\lambda$ greater than $N_i$, and:

$$\gamma_i = 0 \quad [\text{Eq. 7}]$$

for not greater than $N_i$, wherein $\lambda$ is the spectral density of the pre-initialization uniform-gain bins, and $N_i$ is the noise spectral density observed after equalization. Thus, as shown from Eqs. 6 and 7, $\gamma_i$ determines both the usable bandwidth (i.e., the unloaded bins 550 as shown in FIGS. 5 and 8) as well as the gain for each of the discrete bins (i.e., the gain-scaled bins 645 as shown in FIGS. 6 through 8).

In one non-limiting embodiment, $\gamma_i$ may be determined by iteratively varying $\gamma$ until $B_{target}$ is reached. In this non-limiting embodiment, the ATU-C 220 begins with a minimum value of $\gamma$, and then progressively increases $\gamma$ until $B_{target}$ is reached or the given transmission power, $P_{av}$, is exceeded. Thus, a non-limiting example pseudo-code for such an approach would be:

SET $\lambda = 10^{\frac{14.5}{10}} \min_i (N_i)$;

SET P = 0;

SET B = 2;

-continued $$B_{target} = \sum_{i=0}^{255} b_{i,1} = \left( \frac{\left(\frac{R_{desired}}{32}\right) + FOH}{\left(1 - \frac{R_1}{K_1 + R_1}\right)} \right) + roundup\left(\frac{ncloaded_1}{2}\right)$$

WHILE $(P < P_{av})$ AND $(B < B_{target})$ DO $\lambda = 10\lambda$;

IF $0 \le (\lambda - N_i) \le \gamma_i$ THEN $\gamma_i = \lambda - N_i$;

IF $\lambda < N_i$ THEN $\gamma_i = 0$;

IF $(\lambda - N_i) > \gamma_i$ THEN $\gamma_i = 10^{-4.0}$ mW/Hz;

$$P = \sum_{i=0}^{255} \gamma_i;$$

$$b_i = roundup\left(\log_2\left(1 + \frac{SNR_i}{Margin_2 \Gamma}\right)\right);$$

$$B = \sum_{i=0}^{255} b_i;$$

ENDWHILE

The ATU-C 220 may be configured so that the determination of $\gamma_i$ occurs at the transceiver control logic 910. The ATU-C 220 may also be configured so that the determination if $\gamma_i$ may occur at the spectral shaping logic 920, the SNR calculator 935, the bandwidth calculator 940, the power gain calculator 950, or at any combination of the above elements.

Once the spectral shape has been determined by the ATU-C 220, the transceiver control logic 910 provides the determined power level to each of the bins having sufficient capacity for data transmission to generate the optimized bins 845 (FIG. 8). The ATU-C 220 then performs an initialization using the optimized bins 845 (FIG. 8). Thus, during initialization, the transceiver control logic 910 performs conventional initialization procedures, thereby establishing a "handshake" between the ATU-C 220 and the ATU-R 260 (FIG. 2). As part of the conventional initialization procedures, the transceiver control logic 910 loads initialization messages into the optimized bins 845 (FIG. 8) and exchanges initialization messages with the ATU-R 260 (FIG. 2). Additionally, once the ATU-R 260 (FIG. 2) receives the relevant messages from the ATU-C 220, and vice versa, certain parameters related to data mode are established. Since conventional initialization procedures to establish a "handshake" between the ATU-R 260 (FIG. 2) and the ATU-C 220 are well known, only a cursory description of the initialization procedure is provided herein. However, it is worthwhile to note that, upon completing initialization, the ATU-C 220 uses the optimized bins 845 (FIG. 8) for transmission between the ATU-C 220 and the ATU-R 260 (FIG. 2).

Figure 10:
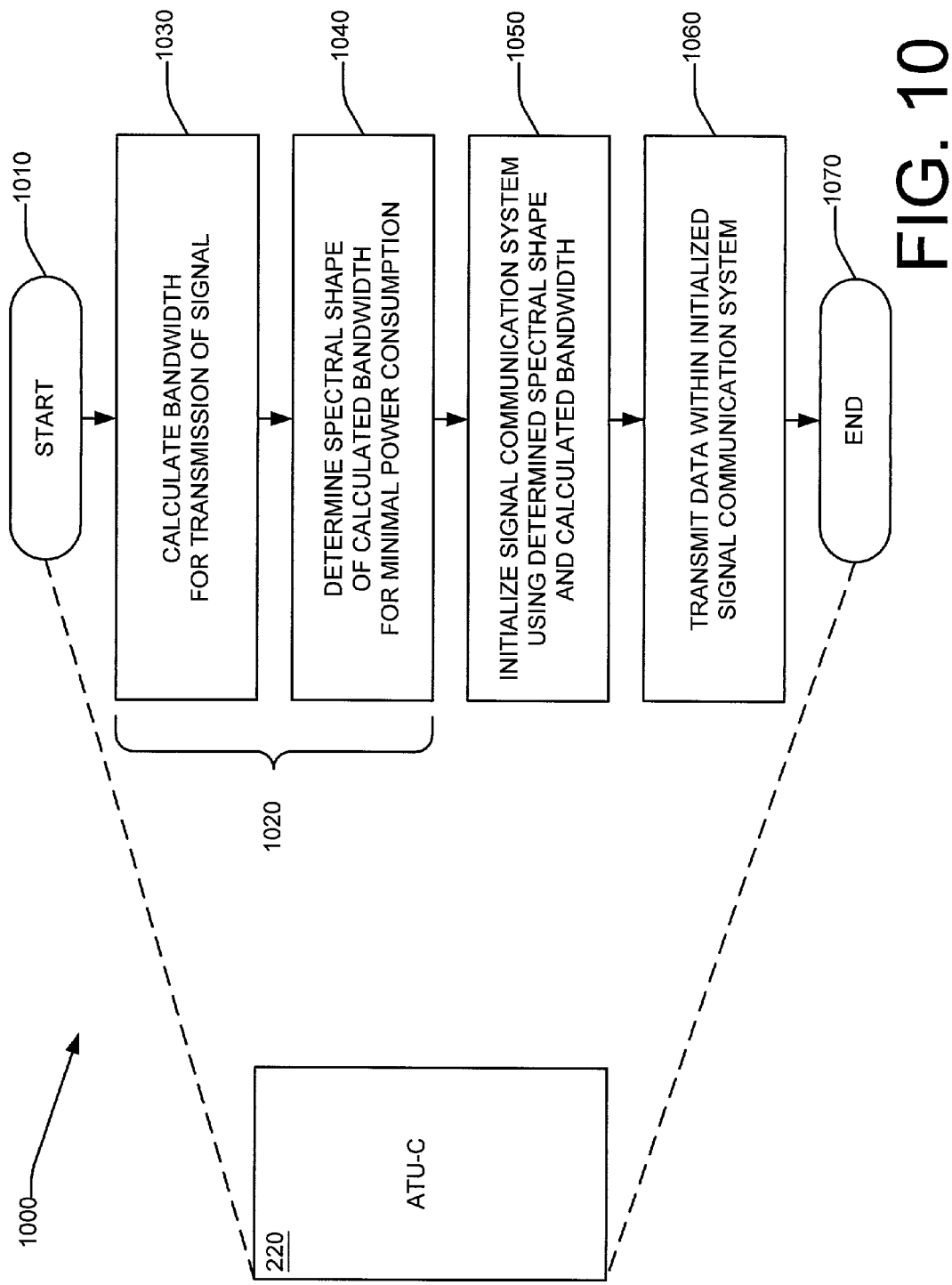
FIG. 10 is a flowchart showing the functionality of the ATU-C of FIG. 9.

FIG. 10 is a flowchart showing the functionality of the ATU-C of FIG. 9. As shown in FIG. 10, one embodiment of the method may be seen as a three-step process comprising a pre-initialization step 1020, an initialization step 1050, and a data transmission step 1060. Furthermore, the pre-initialization step 1020 may be seen as having the steps of calculating, in step 1030, a bandwidth for transmission of signals, and determining, in step 1040, the spectral shape of the calculated bandwidth for minimal (or optimal) power consumption. While the pre-initialization step 1020 is shown as two steps for simplicity of illustration, it will be clear to one of ordinary skill in the art that, in a preferred embodiment, the step of calculating 1030 the bandwidth and the step of determining 1040 the spectral shape occur substantially simultaneously. This is because the same information is needed (e.g., the signal-to-noise ratio (SNR), etc.) for both the bandwidth calculation step 1030 and the spectral shape determination step 1040. This is shown in greater detail with reference to FIGS. 11 through 17.

Figure 11:
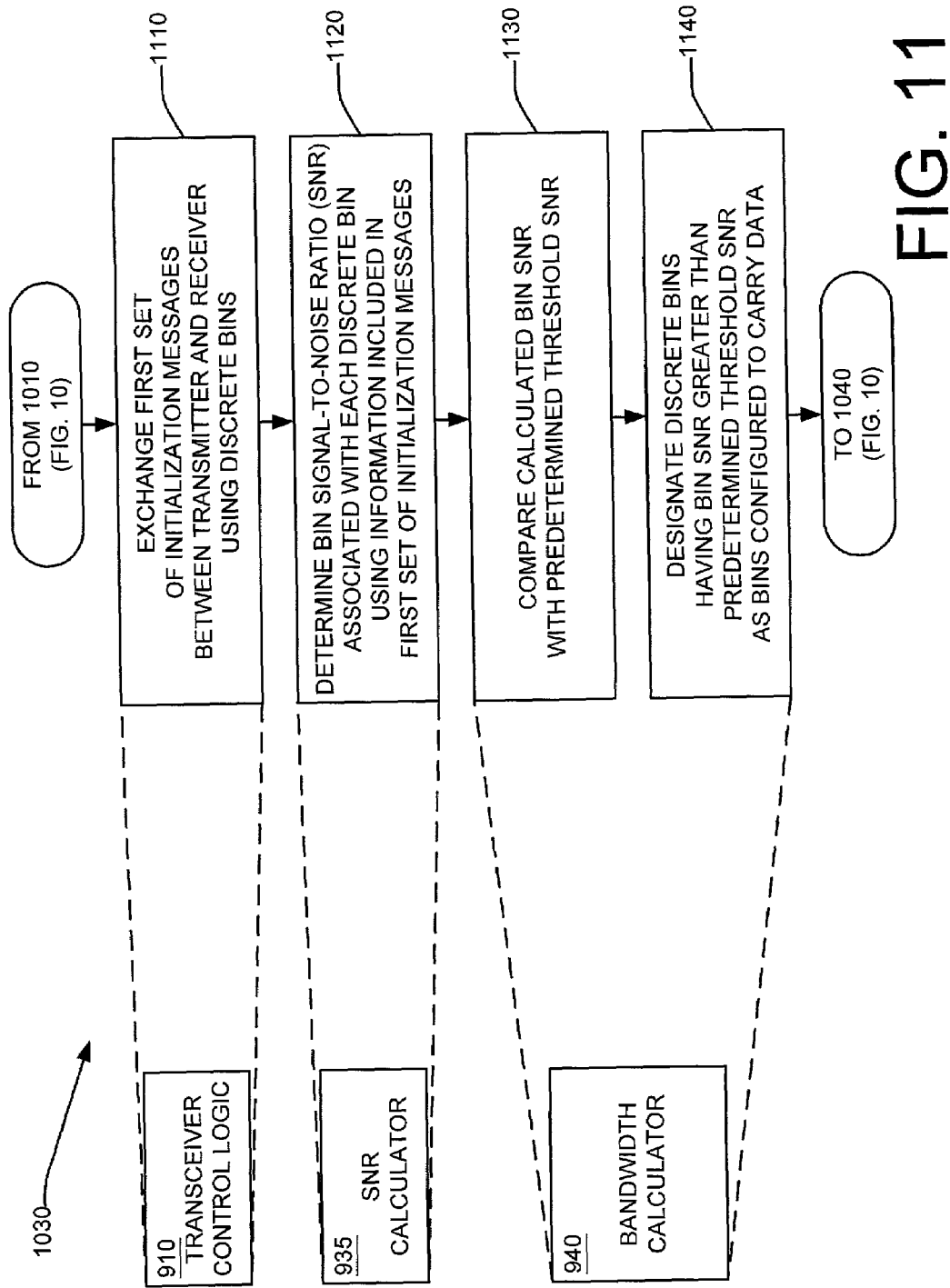
FIG. 11 is a flowchart showing steps associated with bandwidth calculation in the system of FIG. 9.

FIG. 11 is a flowchart showing steps associated with bandwidth calculation 1030 in the system of FIG. 9. The bandwidth calculation begins, in step 1110, with the exchange of a first set of initialization messages between the transmitter and the receiver using discrete bins. In a preferred embodiment, the exchange 1110 of the first set of initialization messages is performed by the transceiver control logic 910 (FIG. 9). Once the first set of initialization messages have been exchanged 1110, the system determines, in step 1120, bin signal-to-noise ratio (SNR) that is associated with each discrete bin. This is done by using the information that was included in the first set of initialization messages, and, in a preferred embodiment, is performed by the SNR calculator 935 (FIG. 9). Having determined 1120 the bin SNR, the system then compares, in step 1130, the determined 1120 bin SNR with a predetermined threshold SNR. The system then designates, in step 1140, those bins having a bin SNR not greater than the predetermined threshold SNR as unloaded bins. All other bins are designated as bins configured to carry data. In a preferred embodiment, the comparing 1130 and designating 1140 steps are performed by the bandwidth calculator 940 (FIG. 9).

Figure 12:
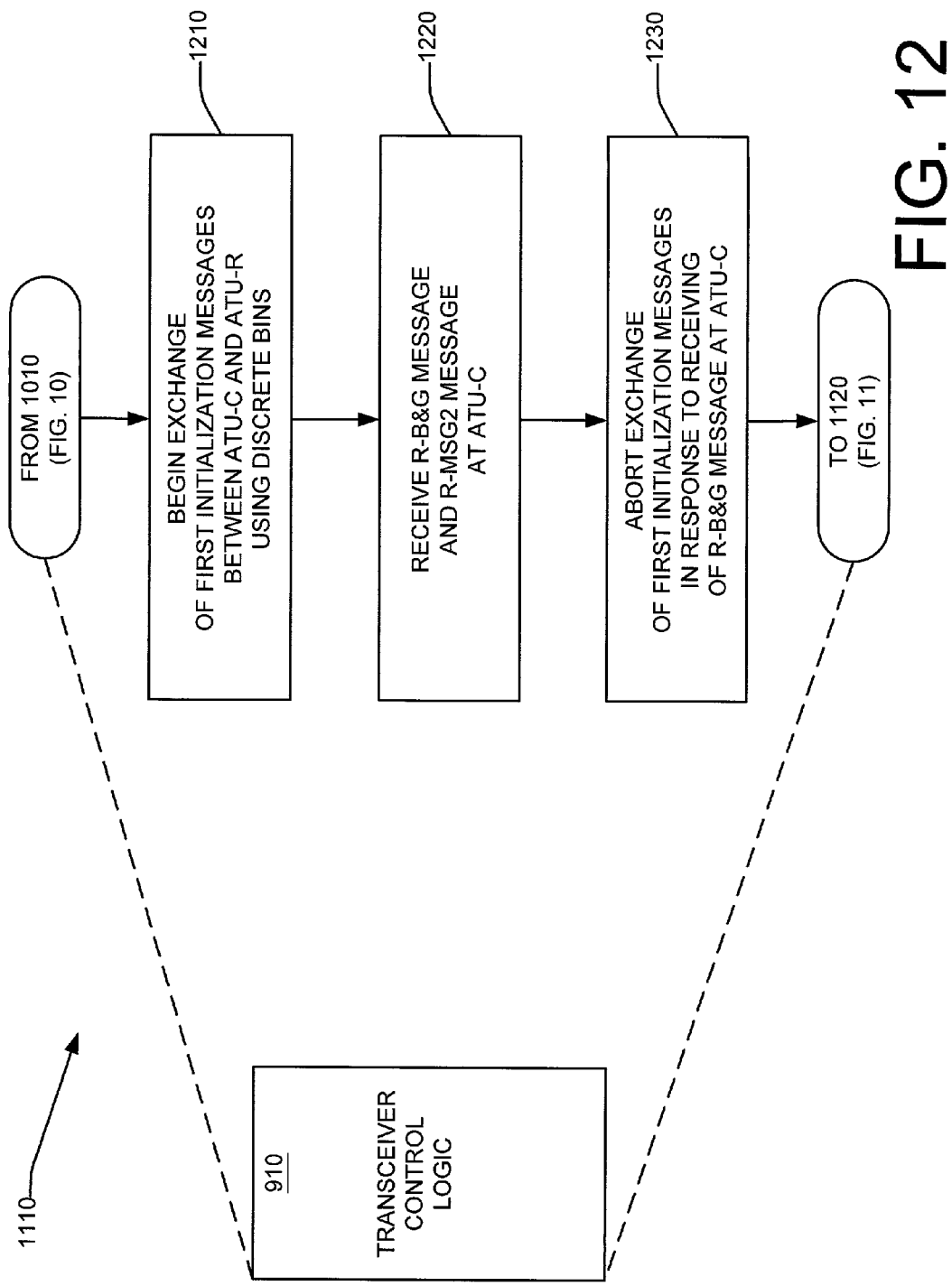
FIG. 12 is a flowchart showing, in greater detail, steps associated with exchanging a first set of initialization messages in FIG. 11.

FIG. 12 is a flowchart showing, in greater detail, steps associated with exchanging 1110 the first set of initialization messages (i.e., the pre-initialization procedure) in FIG. 11. The exchange 1110 of the first set of initialization messages begins, in step 1210, when the transceiver control logic 910 (FIG. 9) begins the exchange between the ATU-C 220 (FIG. 9) and the ATU-R 260 (FIG. 2) using discrete bins. The ATU-C 220 (FIG. 9) then receives, in step 1220, the R-B&G and R-MSG2 messages according to G.DMT or other standards. Once the ATU-C 220 (FIG. 9) receives 1220 the R-B&G message, the transceiver control logic 910 (FIG. 9) aborts, in step 1230, the exchange of the first initialization messages. As described above with reference to FIG. 9, at this point, the ATU-C 220 (FIG. 9) has enough information to determine a spectral shape that reduces transmission power.

Figure 13:
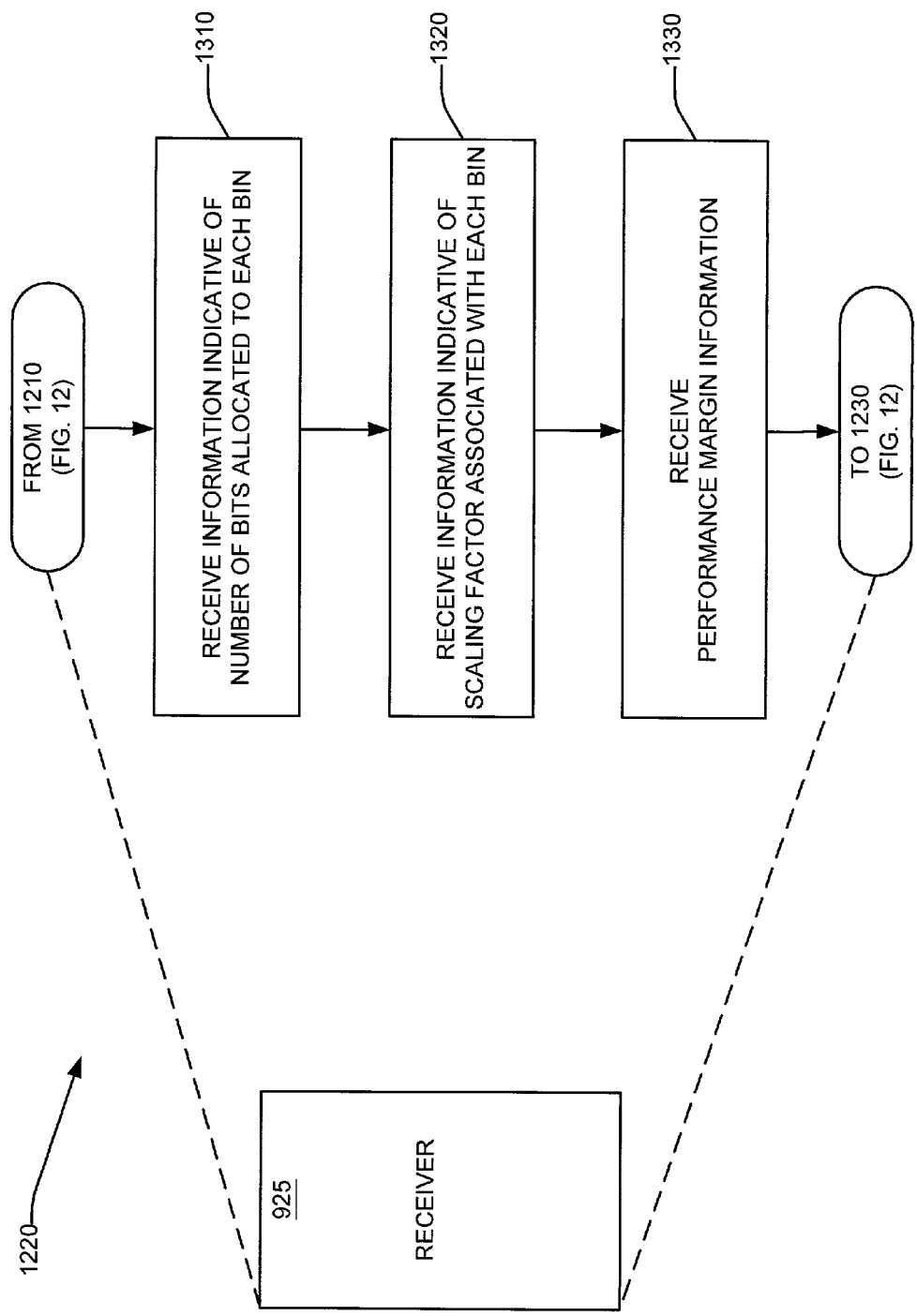
FIG. 13 is a flowchart showing, in greater detail, steps associated with receiving R-B&G and R-MSG2 messages in FIG. 12.

FIG. 13 is a flowchart showing, in greater detail, steps associated with receiving 1220 R-B&G and R-MSG2 messages in FIG. 12. Since the R-B&G message and the R-MSG2 message have information related to the channel, by receiving 1220 the R-B&G message, the receiver 925 (FIG. 9) is receiving, in steps 1310 and 1320, information indicative of the number of bits allocated to each bin and information indicative of a scaling factor associated with each bin. Additionally, since the R-MSG2 message also has information related to the channel, by receiving 1220 the R-MSG2 message, the receiver 925 (FIG. 9) is also receiving, in step 1330, information related to the performance margin of the system.

Figure 14:
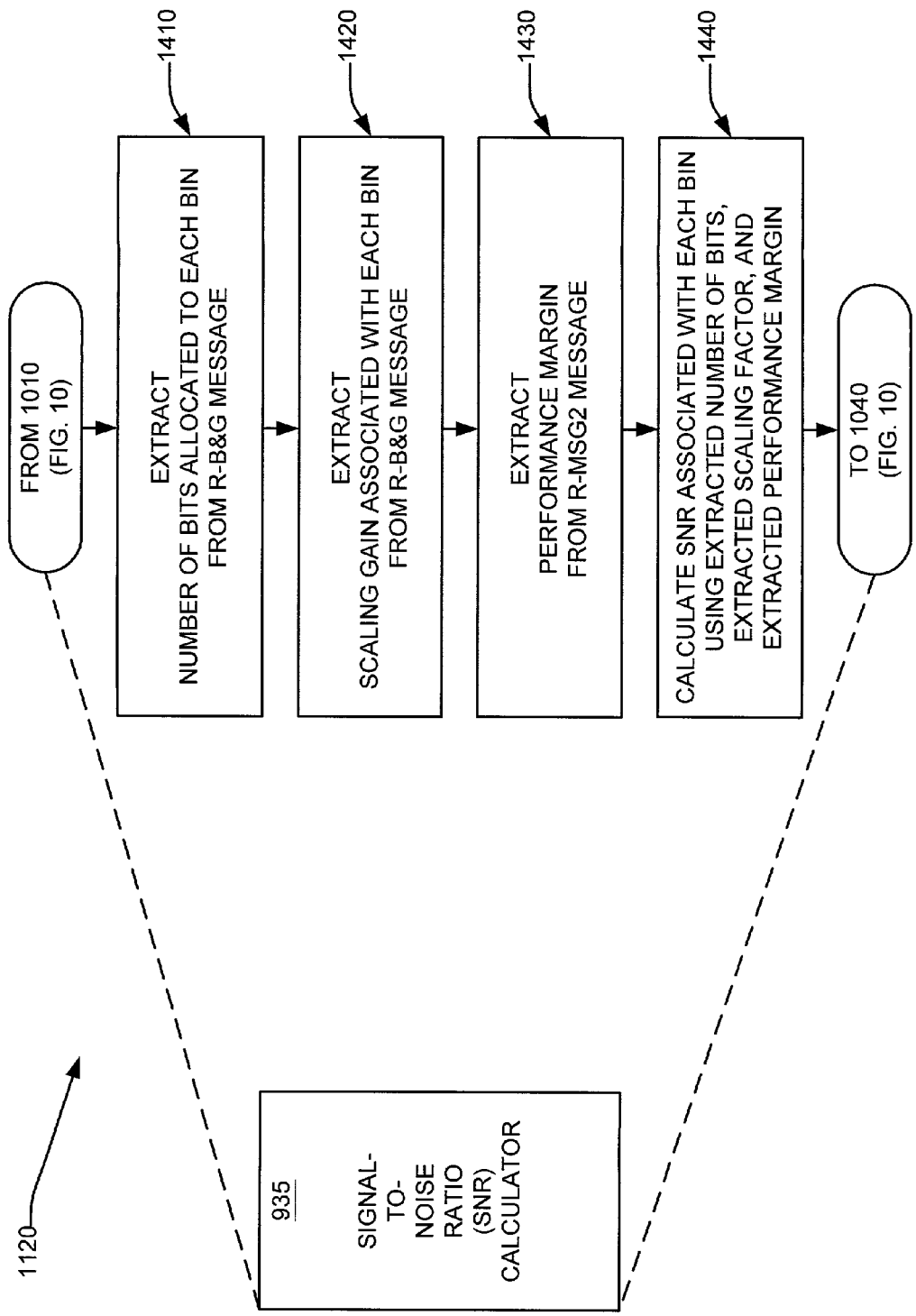
FIG. 14 is a flowchart showing, in greater detail, steps associated with determining a bin signal-to-noise ratio (SNR) in FIG. 11.

FIG. 14 is a flowchart showing, in greater detail, steps associated with determining 1120 the bin signal-to-noise ratio (SNR) in FIG. 11. As described with reference to FIG. 13, each of the R-B&G and R-MSG2 messages have information related to the channel. Thus, the SNR calculator 935 (FIG. 9) extracts, in step 1410, the information on the number of bits allocated to each bin from the R-B&G message. Additionally, the SNR calculator 935 (FIG. 9) also extracts, in step 1420, information on the scaling gain that is associated with each bin from the R-B&G message. Furthermore, the performance margin information is extracted, in step 1430, from the R-MSG2 message. Once all of this information has been extracted 1410, 1420, 1430, the SNR calculator, in step 1440, calculates the SNR associated with each bin using the number of bits, the scaling factor, and the performance margin. In a preferred embodiment, this is done in accordance with Eqs. 1 and 2 as shown with reference to FIG. 9.

Figure 15:
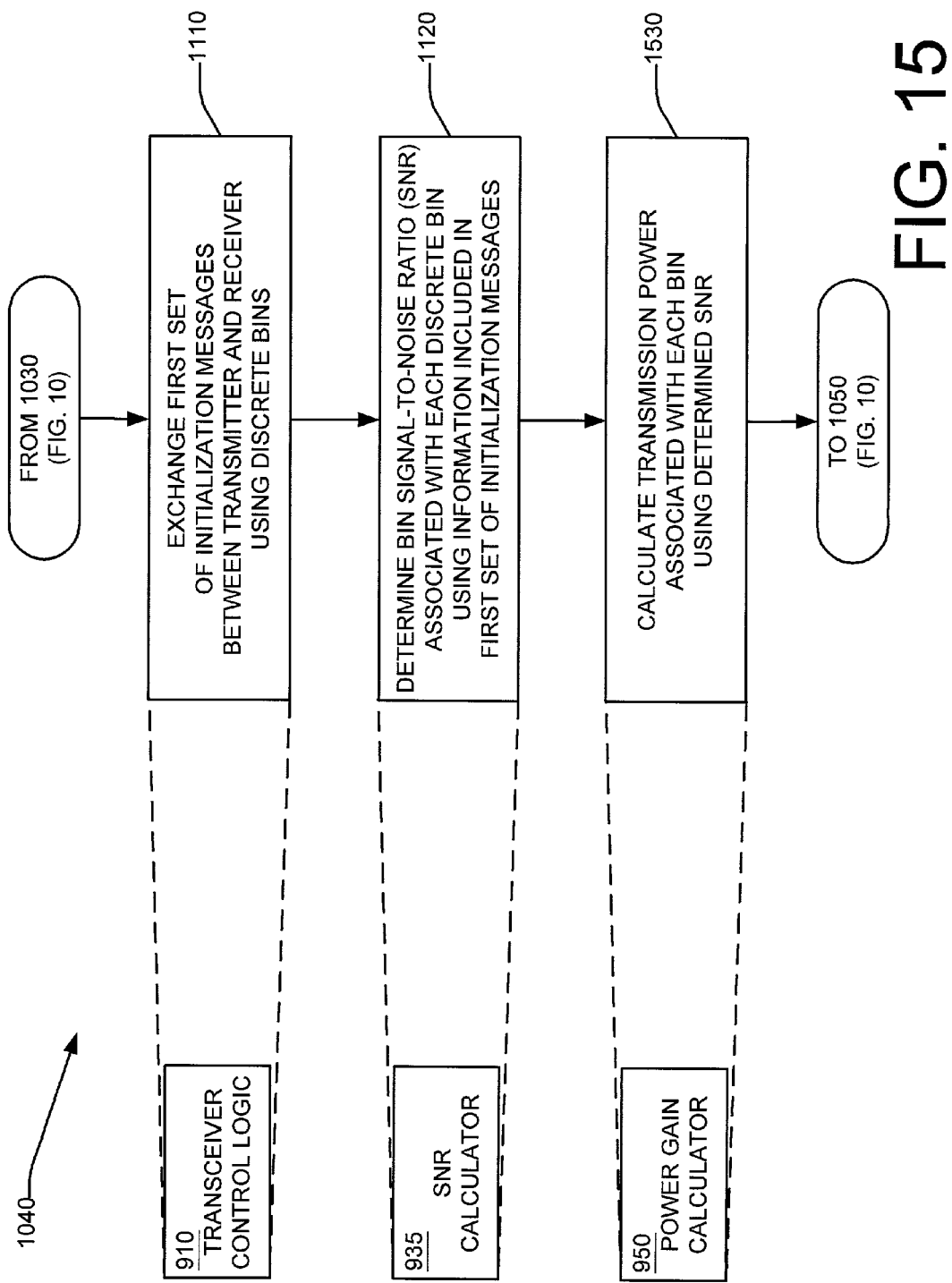
FIG. 15 is a flowchart showing steps associated with determining a spectral shape in the system of FIG. 9.

FIG. 15 is a flowchart showing steps associated with determining 1040 the spectral shape in the system of FIG. 9. Similar to the steps associated with the calculating 1030 of the bandwidth, the determining 1040 of the spectral shape begins with the exchange 1110 of a first set of initialization messages and a determination 1120 of bin SNR. Since these steps are identical to the exchanging step 1110 and the determining step 1120 of FIG. 11, the information gathered from the bandwidth calculation step 1030 may be used here rather than performing another exchange 1510 of initialization messages. Thus, having determined 1120 the bin SNR, the power gain calculator calculates, in step 1530, a transmission power for each of the discrete bins using the determined bin SNR. This is shown in greater detail in FIG. 16.

Figure 16:
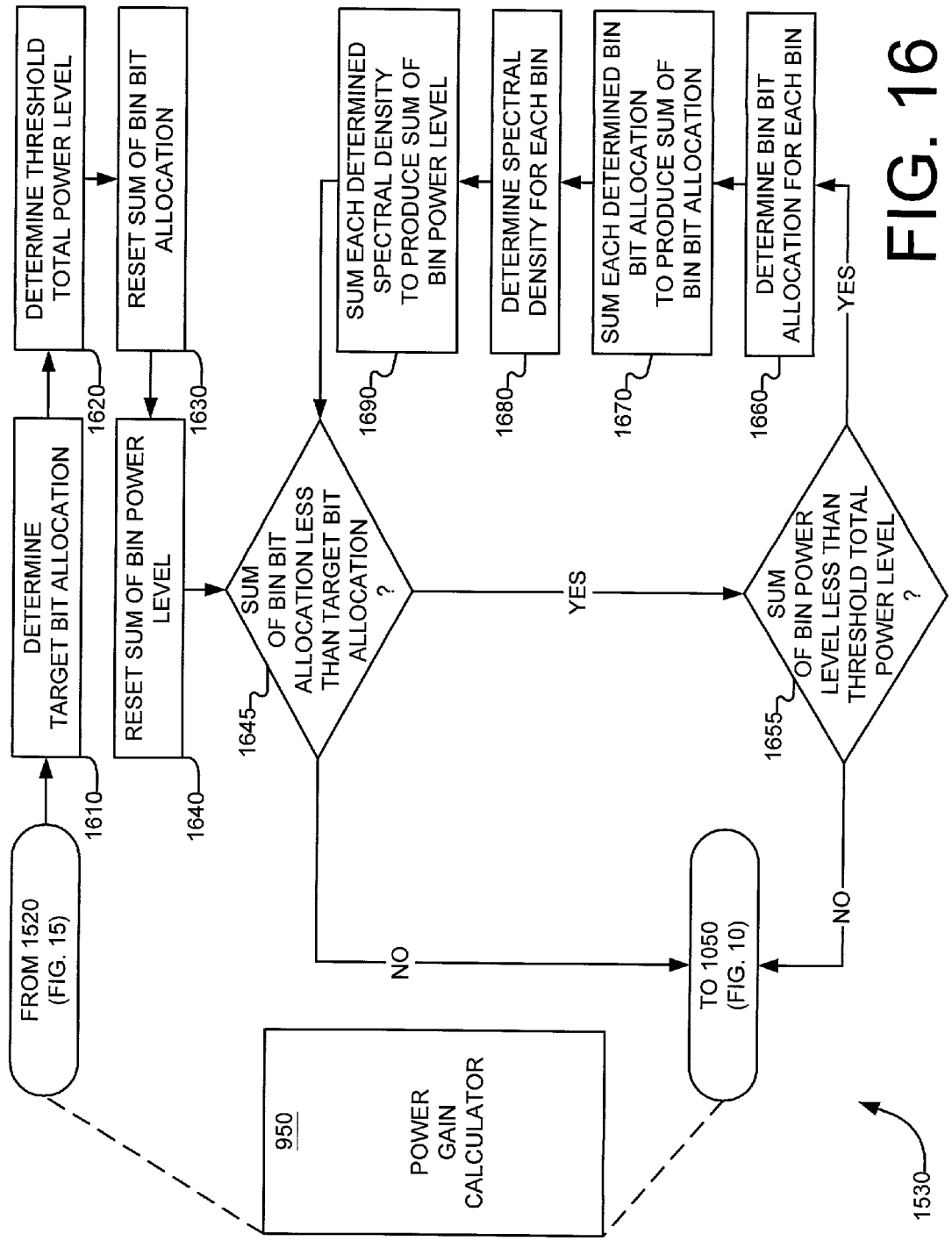
FIG. 16 is a flowchart showing, in greater detail, steps associated with calculating the transmission power in FIG. 15.

FIG. 16 is a flowchart showing, in greater detail, steps associated with calculating 1530 the transmission power in FIG. 15. In a preferred embodiment, these steps reflect the pseudo-code described above with reference to FIG. 9. Thus, in the preferred embodiment, the power gain calculator 950 (FIG. 9) determines, in step 1610 the target bit allocation. This is done in accordance with Eqs. 3, 4, and 5, as explained with reference to FIG. 9. Additionally, the power gain calculator 950 (FIG. 9) determines, in step 1620, a threshold total power level. Once these values have been determined 1610, 1620, the power gain calculator 950 (FIG. 9) resets, in step 1630, the sum of the bin bit allocation and resets, in step 1640, the sum of the bin power level. The power gain calculator 950 (FIG. 9) then determines, in step 1645, whether the sum of the bin bit allocation is less than the target bit allocation. This determination is one check on whether or not the optimum power has been allocated to each bin. If it is determined 1645 that the sum of the bin bit allocation is not less than the target bit allocation, then optimum power level has been reached, and the system performs the initialization step 1050 of FIG. 10. If, on the other hand, it is determined 1645 that the sum of the bin bit allocation is less than the target bit allocation, then the optimum power level has not been reached, and the system further determines, in step 1655, whether the sum of the bin power level is less than the threshold total power level. This determination 1655 checks to see whether an allotted power level has been exceeded and is, therefore, another check on whether or not the optimum power has been allocated to each bin. If it is determined 1655 that the sum of the bin power level is not less than the threshold total power level, then the allotted power has been exceeded, and the system performs the initialization step 1050 of FIG. 10. If, on the other hand, it is determined 1655 that the sum of the bin power level is less than the threshold total power level, then the allotted power has not been exceeded, and the power gain calculator 950 (FIG. 9) determines, in step 1660, a bin bit allocation for each bin. In a preferred embodiment, this is done in accordance with the pseudo-code as set forth with reference to FIG. 9. Each of the bin bit allocations is then summed, in step 1670, to produce the sum of the bin bit allocations. The power gain calculator 950 (FIG. 9) then determines, in step 1680, the spectral density for each bin according to Eqs. 6 or 7. Each of the spectral densities is then summed, in step 1690, to produce the sum of the bin power level. Having determined a new sum of the bin bit allocation and a new sum of the bin power level in steps 1670 and 1690, respectively, the system loops back to steps 1645 and 1655 to once again determine whether the optimum power has been allocated to each bin. This procedure is repeated until the optimum power (i.e., minimum power without exceeding the allotted total power) has been allocated to each bin.

FIG. 17 is a flowchart showing steps associated with initializing 1050 the system of FIG. 2. At this point, the system has performed the pre-initialization step 1020 (FIG. 10) and has determined the optimum spectral shape that will reduce power consumption at the central office 110 (FIG. 1) ATU-C 220 (FIG. 9). Thus, at this point, the ATU-C 220 (FIG. 9) has already determined which bins will be loaded and which bins will be unloaded, and, also, how much power to supply to each of the bins that will be loaded. The transceiver control logic, therefore, performs conventional initialization procedures, thereby establishing a "handshake" between the ATU-C 220 and the ATU-R 260 (FIG. 2). As part of the conventional initialization procedures, the transceiver control logic 910 loads a second set of initialization messages into each discrete bin within the calculated bandwidth (i.e., the bins that are configured to be loaded) in step 1710. Additionally, as described with reference to FIG. 9, once the ATU-R 260 (FIG. 2) receives the relevant messages from the ATU-C 220, and vice versa, certain parameters related to data mode are established. Since conventional initialization procedures to establish a "handshake" between the ATU-R 260 (FIG. 2) and the ATU-C 220 are well known, only a cursory description of the initialization procedure is provided herein. However, it is worthwhile to note that this second set of initialization messages includes information that will prepare the ATU-C 220 (FIG. 2) and the ATU-R (FIG. 2) to enter data mode. The transceiver control logic 910 (FIG. 9) then sets, in step 1720, the transmission power of each loaded bin as a function of the determined spectral shape. Once the appropriate bins have been loaded 1710 and the power level of each bin set 1720, the transceiver control logic 910 (FIG. 9) transmits, in step 1730, the second set of initialization messages using the optimum spectral shape as determined in step 1020. Once the system has been initialized, the ATU-C 220 (FIG. 2) and the ATU-R 260 (FIG. 2) enter data mode to exchange data.

As shown with reference to FIGS. 5 through 8 and FIGS. 10 through 17, by shaping the spectrum of a signal, the power consumption may be reduced, thereby allowing for a greater conservation of power during transmission of data from a transmitter to a receiver. Additionally, if the shaping of the spectrum takes place at a central office (CO), this allows the CO to control the transmission power level rather than merely supplying the power demanded by a remote location.

While the system shows logic circuits configured to calculate the signal-to-noise ratio (SNR), the usable portion of the downstream bandwidth, and the gain associated with each bin in the usable portion of the downstream bandwidth, these logic circuits may be implemented in hardware (as shown or in other equivalent hardware means), software, firmware, or any combination thereof. In one embodiment, the logic circuits are implemented in software or firmware that is stored in a memory and that is executed by a suitable instruction execution system. However, if the logic circuits are implemented in hardware, as in the preferred embodiment, the logic components may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Additionally, while the non-limiting example of FIG. 9 shows several different logic components for performing the different functions (i.e., SNR calculation, bandwidth calculation, power gain calculation, etc.), it will be clear to one of ordinary skill in the art that a single processor may be used to perform the various calculations. Additionally, as described with reference to FIG. 9, there may exist substantial cross-functionality between the several logic components. For example, while the spectral shaping logic and the transceiver control logic are shown as separate components, the system may be implemented in such a way that the transceiver control logic performs part of the spectral shaping, and the spectral shaping logic performs part of the receiving functions of the transceiver control logic. These and other such modifications are intended to be within the scope of the present invention as defined in the claims.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while specific examples of SNR improvements are shown for specifically configured systems, it will be clear to one of ordinary skill in the art that the general concept may be translated to other systems having different levels of noise, different BER, different modulation technique, etc. Additionally, while the method shown in FIGS. 10 through 17 provides a specific method for shaping a downstream spectrum, it will be clear to one of ordinary skill in the art that other analogous methods may be used to shape the spectrum of a downstream signal. Additionally, while a downstream signal is shaped in the non-limiting examples, it will be clear to one of ordinary skill in the art that upstream signals may similarly be shaped for further improvements in power consumption. Furthermore, while a Fourier-based system is used to better illustrate the invention, it will be clear that systems using other bases (e.g., wavelet transform-based systems, Hartley transform-based systems, Haar transform-based systems, Mallat transform-based systems, trigonometric-based transform systems, Walsh transform-based systems, Hadamard transform-based systems, Walsh-Hadamard transform-based systems, discrete cosine transform (DCT) based systems, non-trigonometric transforms, etc.) are also compatible with the invention. All such changes, modifications, and alterations should therefore be seen as within the scope of the present invention.

We claim:

1. A method for reducing power consumption in downstream transmission of signals in asymmetric digital subscriber line (ADSL) systems, comprising the steps of:
   beginning an exchange of first initialization messages between a central office ADSL transceiver unit (ATU-C) and a remote ADSL transceiver unit (ATU-R), wherein the first initialization messages are carried in discrete bins;
   receiving a R-B&G message and a R-MSG2 message at the ATU-C during the exchange of the first initialization messages;
   aborting the exchange of the first initialization messages in response to the receiving of the R-B&G message at the ATU-C;
   extracting a number of bits, $b_i$, allocated to each bin, i, from the R-B&G message;
   extracting a scaling factor, $g_i$, associated with each bin, i, from the R-B&G message;
   extracting performance margin information, M, from the R-MSG2 message;
   calculating a signal-to-noise ratio (SNR) associated with each bin, i, from the extracted number of bits, the extracted scaling factor, and the extracted performance margin information as:

$$SNR_i = \frac{(2^{b_i} - 1)\Gamma}{g_i^2} \times 10^{\frac{M}{10}},$$

wherein $\Gamma$ is a SNR gap;
   determining a number of bits per tone for a predetermined rate using the calculated SNR;
   determining a spectral density associated with each bin using the calculated SNR;
   initializing the ADSL system using the determined spectral density number of bits per tone and the determined spectral density; and
   transmitting data using the initialized ADSL system.

2. A method for reducing power consumption in signal transmission systems, comprising the steps of:
   calculating a bandwidth for a transmission of a signal;
   determining a spectral shape for the calculated bandwidth, wherein the spectral shape is configured to substantially minimize power consumption during the transmission of the signal;
   initializing a signal transmission system using the determined spectral shape and the calculated bandwidth; and
   transmitting data within the initialized signal transmission system;
   wherein the step of calculating the bandwidth comprises the steps of:
   exchanging a first set of initialization messages between a transmitter and a receiver, wherein the first set of initialization messages are exchanged using discrete bins;
   determining a bin signal-to-noise ratio (SNR) associated with each of the discrete bins using information included within the first set of initialization messages;
   comparing the determined bin SNR with a predetermined threshold SNR; and
   designating the discrete bins having a greater bin SNR than the predetermined threshold SNR as bins configured to carry data.

3. The method of claim 2, wherein the transmitter is a central office ADSL transceiver unit (ATU-C) and the receiver is a remote ADSL transceiver unit (ATU-R).

4. The method of claim 3, wherein the step of exchanging a first set of initialization messages comprises the steps of:
- beginning an exchange of first initialization messages between the central office ADSL transceiver unit (ATU-C) and the remote ADSL transceiver unit (ATU-R), wherein the first initialization messages are carried in discrete bins;
- receiving a R-B&G message and a R-MSG2 message at the ATU-C during the exchange of the first initialization messages; and
- aborting the exchange of the first initialization messages in response to the receiving of the R-B&G message at the ATU-C.

5. The method of claim 4, wherein the step of receiving the R-B&G message and the R-MSG2 message comprises the steps of:
- receiving information indicative of a number of bits allocated to each bin;
- receiving information indicative of a scaling factor associated with each bin; and
- receiving performance margin information.

6. The method of claim 5, wherein the step of determining the bin signal-to-noise ratio (SNR) comprises the steps of:
- extracting the number of bits, $b_i$, allocated to each bin, i, from the R-B&G message;
- extracting the scaling factor, $g_i$, associated with each bin, i, from the R-B&G message;
- extracting the performance margin, M, from the R-MSG2 message; and
- calculating a signal-to-noise ratio (SNR) associated with each bin, i, from the extracted number of bits, the extracted scaling factor, and the extracted performance margin as:

$$SNR_i = \frac{(2^{b_i} - 1)\Gamma}{g_i^2} \times 10^{\frac{M}{10}},$$

wherein $\Gamma$ is a SNR gap.

7. The method of claim 6, wherein the SNR gap is 9.55.

8. The method of claim 2, wherein the step of determining the spectral shape comprises the steps of:
- exchanging a first set of initialization messages between a transmitter and a receiver, wherein the first set of initialization messages are exchanged using discrete bins;
- determining a bin signal-to-noise ratio (SNR) associated with each of the discrete bins using information included within the first set of initialization messages;
- calculating a transmission power output associated with each bin using the determined bin SNR.

9. The method of claim 8, wherein the transmitter is a central office ADSL transceiver unit (ATU-C) and the receiver is a remote ADSL transceiver unit (ATU-R).

10. The method of claim 9, wherein the step of exchanging a first set of initialization messages comprises the steps of:
- beginning an exchange of first initialization messages between the central office ADSL transceiver unit (ATU-C) and the remote ADSL transceiver unit (ATU-R), wherein the first initialization messages are carried in discrete bins;
- receiving a R-B&G message and a R-MSG2 message at the ATU-C during the exchange of the first initialization messages; and
- aborting the exchange of the first initialization messages in response to the receiving of the R-B&G message at the ATU-C.

11. The method of claim 10, wherein the step of receiving the R-B&G message and the R-MSG2 message comprises the steps of:
- receiving information indicative of a number of bits allocated to each bin;
- receiving information indicative of a scaling factor associated with each bin; and
- receiving performance margin information.

12. The method of claim 11, wherein the step of determining the bin signal-to-noise ratio (SNR) comprises the steps of:
- extracting the number of bits, $b_i$, allocated to each bin, i, from the R-B&G message;
- extracting the scaling factor, $g_i$, associated with each bin, i, from the R-B&G message;
- extracting the performance margin, M, from the R-MSG2 message; and
- calculating a signal-to-noise ratio (SNR) associated with each bin, i, from the extracted number of bits, the extracted scaling factor, and the extracted performance margin as:

$$SNR_i = \frac{(2^{b_i} - 1)\Gamma}{g_i^2} \times 10^{\frac{M}{10}},$$

wherein $\Gamma$ is a SNR gap.

13. The method of claim 8, wherein the step of calculating the transmission power output comprises the steps of:
- determining a target bit allocation;
- determining a threshold total power level; and
- iteratively computing a bin bit allocation and a bin power level for each bin until either a sum of the bin bit allocation exceeds the target bit allocation or a sum of the bin power level exceeds the threshold total power level.

14. The method of claim 13, wherein the step of iteratively computing the bin bit allocation comprises the steps of:
- determining a bin bit allocation for each bin; and
- summing each of the determined bin bit allocations to produce the sum of the bin bit allocation.

15. The method of claim 13, wherein the step of iteratively computing the bin power level comprises the steps of:
- determining a spectral density for each bin; and
- summing each of the determined spectral densities to produce the sum of the bin power level.

16. The method of claim 2, wherein the signal communication system is an asymmetric digital subscriber line (ADSL) system employing discrete multi-tone (DMT) technology, wherein data is transmitted in discrete bins.

17. The method of claim 16, wherein the step of initializing of the signal communication system further comprises the steps of:
- loading a second set of initialization messages into each of the discrete bins within the calculated bandwidth;
- setting a transmission power of each of the loaded bins, wherein the transmission power is a function of the determined spectral shape;
- transmitting the second set of initialization messages in each of the loaded bins using the set transmission power for each of the loaded bins.

* * * * *